(12) United States Patent
Hashimoto et al.

(10) Patent No.: US 6,789,655 B2
(45) Date of Patent: Sep. 14, 2004

(54) DAMPER MECHANISM

(75) Inventors: Yasuyuki Hashimoto, Neyagawa (JP); Michitomo Masaki, Kyoto (JP); Tatsuyuki Aoki, Ibaraki (JP)

(73) Assignee: Exedy Corporation, Osaka (JP)

( * ) Notice: Subject to any disclaimer, the term of this patent is extended or adjusted under 35 U.S.C. 154(b) by 0 days.

(21) Appl. No.: 10/085,053

(22) Filed: Mar. 1, 2002

(65) Prior Publication Data

US 2002/0124684 A1 Sep. 12, 2002

(30) Foreign Application Priority Data

Mar. 9, 2001 (JP) ........................................ 2001-067422

(51) Int. Cl.$^7$ ............................................. F16D 13/38
(52) U.S. Cl. ................... 192/70.17; 192/30 V; 192/209
(58) Field of Search ........................... 192/70.17, 30 V, 192/207, 209, 211, 213.21, 213.22, 213.3

(56) References Cited

U.S. PATENT DOCUMENTS

| | | | | |
|---|---|---|---|---|
| 5,725,080 | A | * | 3/1998 | Lohaus ................... 192/213.21 |
| 5,984,073 | A | * | 11/1999 | Lohaus et al. .......... 192/213.21 |
| 6,128,972 | A | * | 10/2000 | Cooke et al. ............. 192/30 V |
| 6,264,563 | B1 | * | 7/2001 | Mizukami ............... 192/213.22 |
| 6,270,417 | B1 | | 8/2001 | Hashimoto |
| 6,375,575 | B2 | * | 4/2002 | Hashimoto ............. 192/213.22 |

FOREIGN PATENT DOCUMENTS

| | | | | |
|---|---|---|---|---|
| DE | 019932967 A1 | * | 2/2000 | ............. F16D/3/14 |
| JP | 411280784 A | * | 10/1999 | ........... F16D/13/64 |
| JP | 02000027945 A | * | 1/2000 | ........... F16F/15/129 |
| JP | 2000035053 | * | 2/2000 | ........... F16D/13/64 |

* cited by examiner

*Primary Examiner*—Charles A Marmor
*Assistant Examiner*—Eric M. Williams
(74) *Attorney, Agent, or Firm*—Shinjyu Global Counselors, LLP

(57) ABSTRACT

A damper mechanism is provided to suppress the enlargement of a prescribed angle in a damper mechanism. A clutch disk assembly 1 has an input rotary member 2, a spline hub 3, a damper section 4, a large friction mechanism 13, a friction suppressing mechanism, and an elastic member 104. The spline hub 3 is arranged to rotate relative to the input rotary member 2. The damper section 4 couples the input rotary member 2 and the spline hub 3 together rotationally. The large friction mechanism 13 can generate friction when the input rotary member 2 and the spline hub rotate relative to each other. The friction suppressing mechanism is a rotational gap θACp for preventing the large friction mechanism operating within a prescribed angular range. The elastic member 104 softens the impact between the members that touch against each other at the end of the prescribed angular range.

21 Claims, 20 Drawing Sheets

DAMPER MECHANISM

BACKGROUND OF THE INVENTION

1. Field of the Invention

The present invention relates to a damper mechanism. More specifically, the present invention relates more particularly to a damper mechanism for damping torsional vibrations in a power transmission system.

2. Background Information

Clutch disk assemblies used in vehicles function as a clutch for engaging and disengaging a flywheel to facilitate the transfer of torque from an engine. Clutch disk assemblies also function as a damper mechanism for absorbing and damping torsional vibrations from the flywheel. In general, vehicle vibrations include idling-related noises such as rattling sounds, traveling-related noises such as rattling associated with acceleration and deceleration and muffled noises, and tip-in/tip-out or low frequency vibrations. The damper function of the clutch disk assembly is provided ideally to eliminate these noises and vibrations.

Idling-related noises are rattling noises that emit from the transmission when the gearshift is put into neutral and the clutch pedal is released. For example, while waiting at a traffic light a driver might shift the gear into neutral, causing the transmission to rattle. When the engine is running at a speed in the vicinity of idling speed, the engine torque is relatively low and the torque change at the time of each power stroke explosion is relatively large. Under these conditions, the teeth of the transmission input gear and counter gear undergo a phenomenon of striking against one another.

Tip-in and tip-out or low frequency vibrations refer to large-scale lengthwise shaking of the vehicle that occurs when the accelerator pedal is depressed or released suddenly. If the rigidity of the drive transmission system is low, the torque transmitted to the tires is transmitted back from the tires as torque and a resulting lurching reaction causes excessive torque to be generated at the tires. As a result, longitudinal vibrations occur that shake the vehicle excessively back and forth.

In the case of idling noises the problem lies in the zero torque region of the torsion characteristic of the clutch disk assembly. The problem is alleviated if the torsional rigidity is low. Conversely, it is necessary for the torsion characteristic of the clutch disk assembly to be as rigid as possible to suppress the longitudinal vibrations caused by tip-in and tip-out.

In order to solve this problem, a clutch disk assembly has been proposed which has a two-stage characteristic obtained by using two types of springs. The first stage or low twisting angle region of the torsion characteristic has a relatively low torsional rigidity and low hysteresis torque, and provides a noise preventing effect during idling. Meanwhile, the second stage or high twisting angle region of the torsion characteristic has a relatively high torsional rigidity and high hysteresis torque. Thus, the second stage is sufficiently capable of damping the longitudinal vibrations of tip-in and tip-out.

A damper mechanism that efficiently absorbs small torsional vibrations is also known. The damper mechanism is configured to have a low hysteresis torque in the second stage of the torsion characteristic and does not allow a large friction mechanism of the second stage to operate when small vibrations are inputted due to such factors as combustion fluctuations in the engine. A damper mechanism with a rotational gap has been provided. The damper mechanism does not allow the large friction mechanism of the second stage to operate within a prescribed angular range in the second stage of the torsion characteristic. The damper mechanism is arranged, for example, such that a rotational gap is secured between two members and the large friction mechanism of the second stage is not allowed to operate within the scope of the gap. However, since the frictional resistance is small within the gap, variations in the rotational speed of the engine cause the two members to strike constantly against each other and thus be subjected to physical shock. Consequently, over a long period of use, the two members wear causing the gap to become larger than the original gap setting. When the gap in which the large friction mechanism of the second stage is not allowed to operate becomes larger, the ability of the mechanism to absorb noise and vibrations declines.

In view of the above, there exists a need for a damper mechanism that overcomes the above-mentioned problems in the prior art. This invention addresses this need in the prior art as well as other needs, which will become apparent to those skilled in the art from this disclosure.

SUMMARY OF THE INVENTION

An object of the present invention is to suppress the enlargement of the prescribed angle in a damper mechanism that is configured not to allow a friction mechanism to operate within a prescribed angular range.

A damper mechanism described in accordance with a preferred embodiment of the present invention has a first rotary member, a second rotary member, a damper section, a friction mechanism, a friction suppressing mechanism, and an elastic member. The second rotary member is arranged such that it can rotate relative to the first rotary member. The damper section elastically couples the first rotary member and the second rotary member together in a rotational direction. The friction mechanism can generate friction when the first rotary member and the second rotary member rotate relative to each other. The friction suppressing mechanism is configured to prevent the friction mechanism from operating within a prescribed angular range. The elastic member softens the impact between members that touch each other at the end of the prescribed angle. With this damper mechanism, the members can strike against each other at the ends of the prescribed angular range due to engine combustion fluctuations because the frictional mechanism does not operate within the prescribed angular range due to the elastic members. However, since the elastic members soften the impact between the members that contact each other, wearing of the members is reduced and enlargement of the prescribed angular range is suppressed.

A damper mechanism in accordance with a second aspect of the present invention is the damper mechanism of the first aspect, wherein the elastic member is arranged such that it can be compressed in the rotational direction within the prescribed angular range. With this damper mechanism, rigidity of the elastic member is configured such that within the prescribed angular range, the elastic member is compressed within the prescribed angular range.

A damper mechanism in accordance with a third aspect of the present invention is the damper mechanism of the first or second aspect, wherein the friction suppressing mechanism has two members aligned in the rotational direction and the elastic member is disposed rotationally between the two members. With this damper mechanism, the elastic members soften the impact between the two members of friction suppressing mechanism.

A damper mechanism in accordance with a fourth aspect of the present invention is the damper mechanism of the third aspect, wherein the two rotary members include a first member and a second member. The first member is plate-like and has a hole formed therein. The second member is arranged within the hole such that it can move in a rotational direction. The elastic member is also arranged inside the hole and in rotational alignment with the second member. The elastic member can be compressed between the second member and the edge of the hole. With this damper mechanism, the elastic member is disposed inside the hole and is compressed between the second member and the edge of the hole.

A damper mechanism in accordance with a fifth aspect of the present invention is the damper mechanism of the third or fourth aspect, wherein the two rotary members include a third member and a fourth member. The third member has a plurality of internal teeth. The fourth member has a plurality of external teeth. The external teeth are arranged so as to have a rotational gap with respect to the plurality of internal teeth. The elastic member is disposed rotationally between the internal teeth and the external teeth. With this damper mechanism, the elastic member is disposed rotationally between the internal teeth and external teeth, and is compressed between the internal teeth and external teeth.

These and other objects, features, aspects, and advantages of the present invention will become apparent to those skilled in the art from the following detailed description, which taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Figure 1:
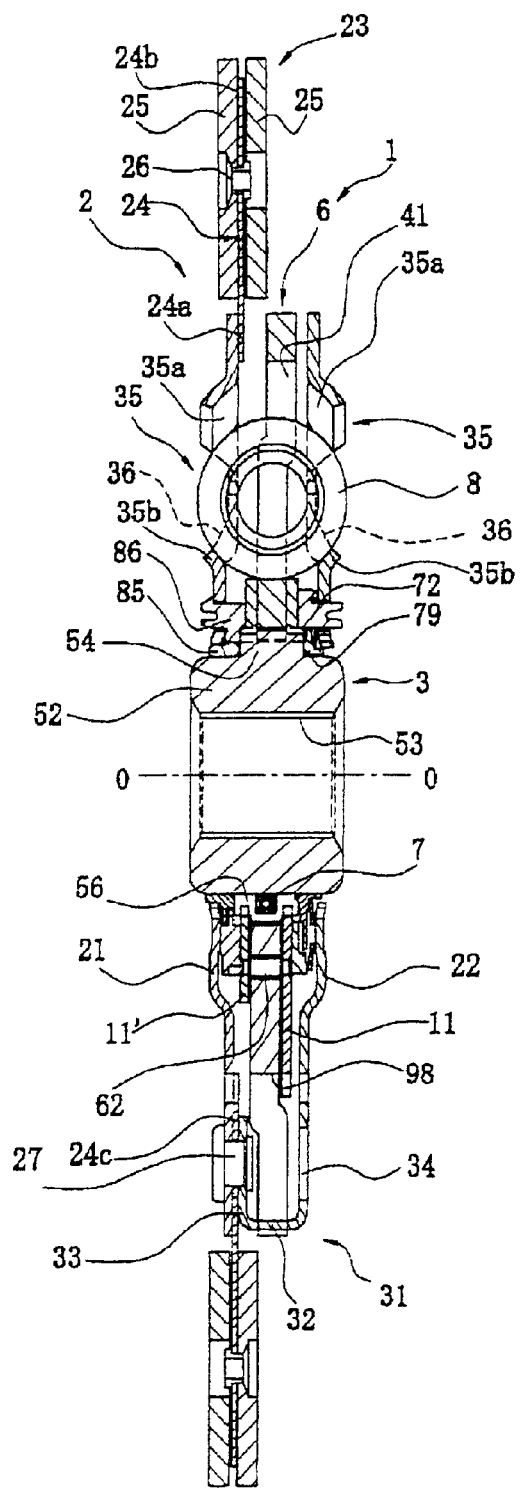
FIG. 1 is a vertical cross-sectional schematic view of a clutch disk assembly in accordance with a preferred embodiment of the present invention.
Figure 2:
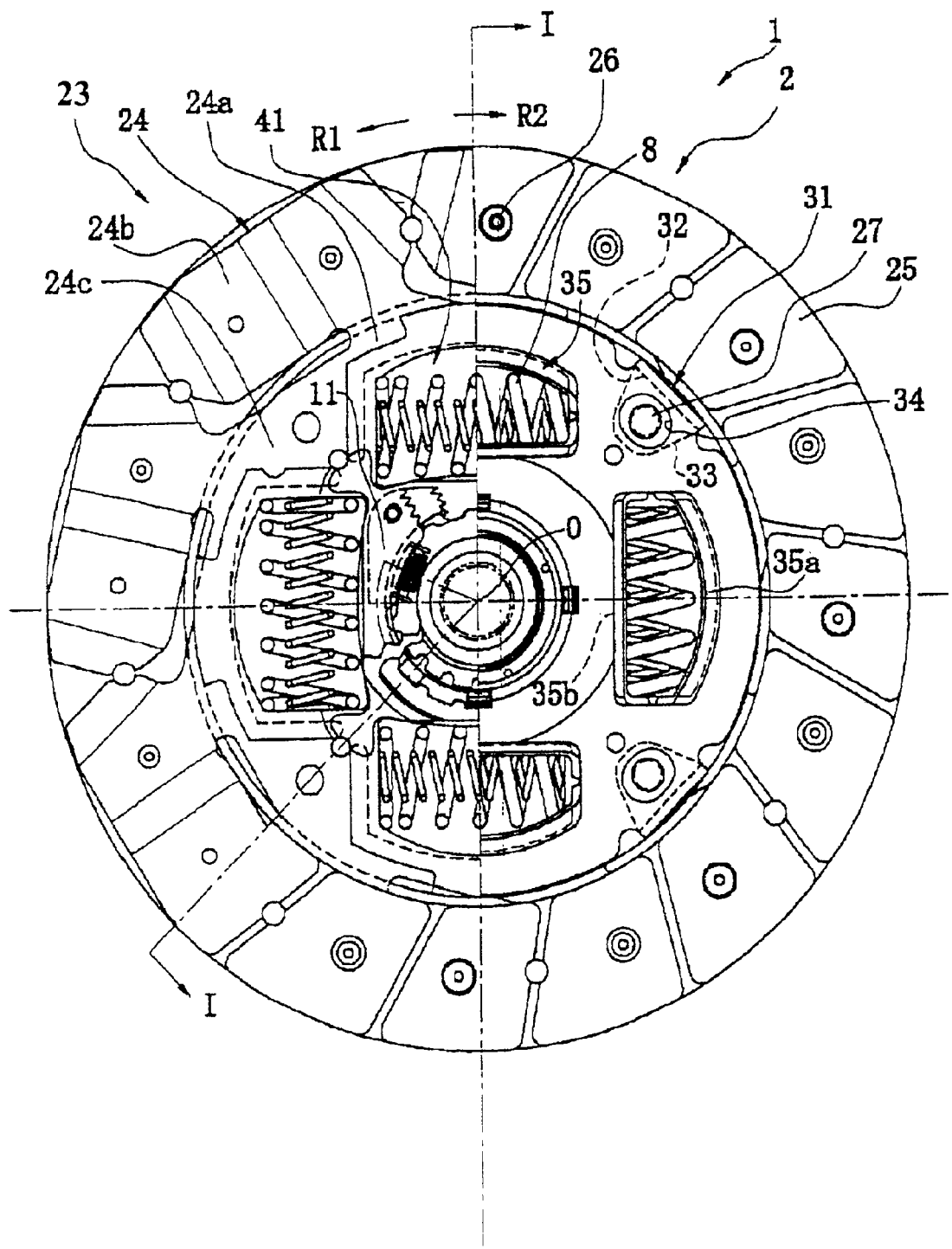
FIG. 2 is an elevational view of the clutch disk assembly of FIG. 1.

FIG. 1 illustrates a cross-sectional view of a clutch disk assembly 1 in accordance with a preferred embodiment of the present invention. FIG. 2 is an elevational view of the same. The clutch disk assembly 1 is a power transmission device used in the clutch device of a vehicle. The clutch disk assembly 1 has a clutch function and a damper function. The clutch function connects and disconnects torque by engaging and disengaging a flywheel (not shown) of an engine (not shown). The damper function absorbs and damps torque fluctuations that are received from the flywheel side using springs and the like.

Figure 10:
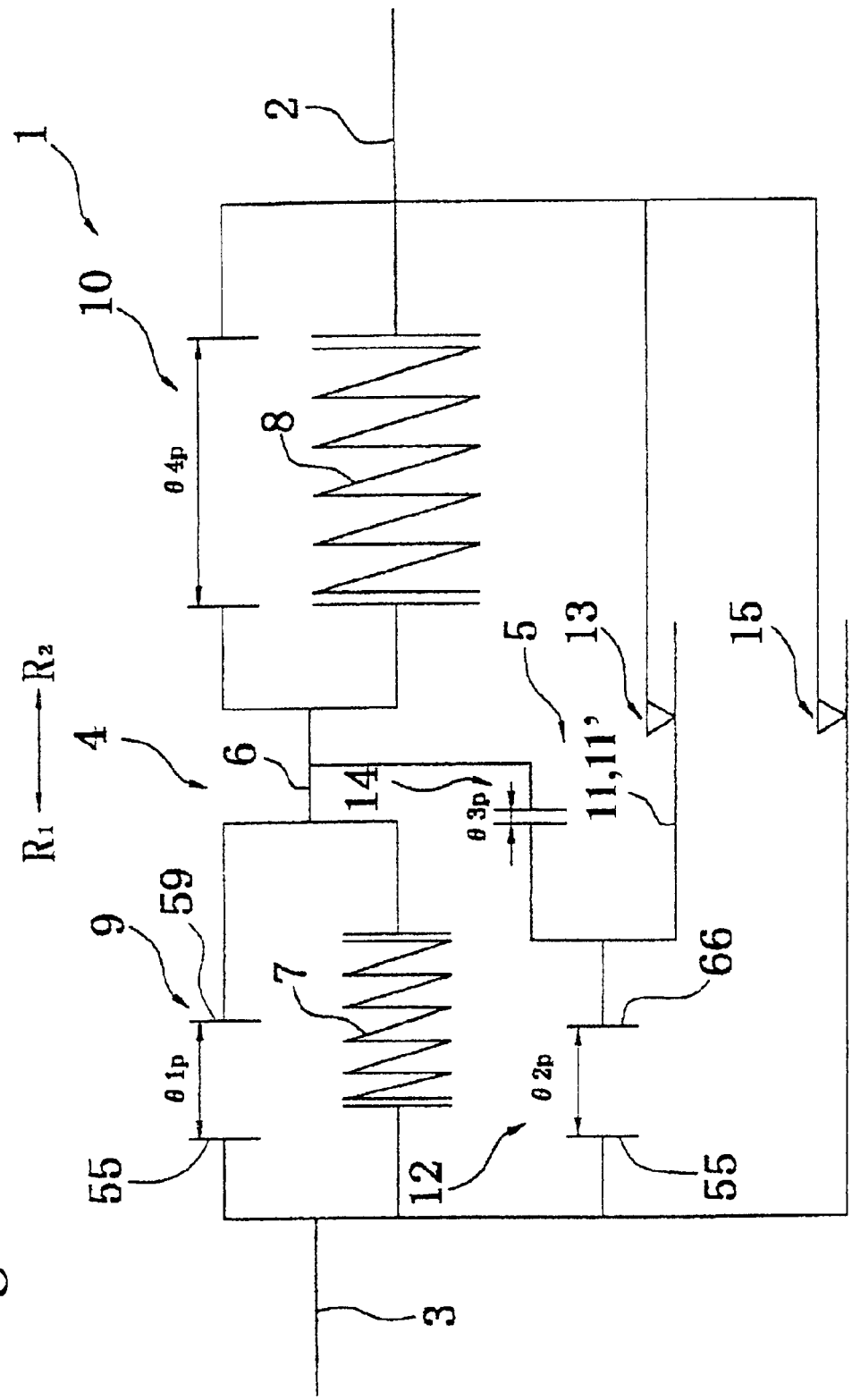
FIG. 10 is diagrammatical view of a mechanical circuit of a damper mechanism of the clutch disk assembly.

Line O—O in FIG. 1 represents a rotational axis, i.e., rotational centerline, of the clutch disk assembly 1. The engine and flywheel (not shown) are disposed to the left of FIG. 1 and the transmission (not shown) is disposed to the right of FIG. 1. In FIG. 2, the R1 direction is the rotational drive direction or positive direction of the clutch disk assembly 1, and the R2 direction is the opposite direction or negative direction. The clutch disk assembly 1 chiefly has an input rotary member 2, a spline hub 3, and a damper section 4, as indicated in FIG. 10. As seen in FIG. 10, the spline hub 3 serves as an output rotary member. The damper section 4 is disposed between the input rotary member 2 and the spline hub 3. The damper section 4 includes first springs 7, second springs 8, and a large friction mechanism 13.

Referring again to FIGS. 1 and 2, the input rotary member 2 is the member to which torque is delivered from the flywheel (not shown). The input rotary member 2 chiefly has a clutch plate 21, a retaining plate 22, and a clutch disk 23. The clutch plate 21 and the retaining plate 22 are preferably both made of sheet metal having a disk-like or ring-like shape. The clutch plate 21 and the retaining plate 22 are disposed with a prescribed spacing therebetween in the axial direction. The clutch plate 21 is disposed on the engine side and the retaining plate 22 is disposed on the transmission side of the clutch disk assembly 1. The clutch plate 21 and the retaining plate 22 are fixed together by plate-like coupling parts 31 which are discussed later. The plate-like coupling parts 31 determine the axial spacing between the two plates 21 and 22, and cause the plates 21 and 22 to rotate as a single unit.

The clutch disk 23 is the portion that is pressed against the flywheel (not shown). The clutch disk 23 chiefly has a cushioning plate 24 and first and second friction facings 25. The cushioning plate 24 has an annular part 24a, a plurality of cushioning parts 24b, and a plurality of coupling parts 24c. The plurality of cushioning parts 24b is arranged annularly around the outer perimeter of the annular part 24a. The plurality of coupling parts 24c extends radially inward from the annular part 24a. The coupling parts 24c are preferably provided in four locations. Each coupling part 24c is fastened to the clutch plate 21 with rivets 27 (discussed later). The friction facings 25 are fastened to both faces of each cushioning part 24b of the cushioning plate 24 using rivets 26.

There are preferably four window holes 35 that are provided in an outer circumferential section of each of clutch plate 21 and retaining plate 22 with equal spacing in the circumferential direction. Cut-and-raised parts 35a and 35b are formed on radial sides of each window hole 35. The cut-and-raised parts 35a are formed on a radially outer part of the window holes 35. The cut-and-raised parts 35b are formed on a radially inner part of the window holes 35. These cut-and-raised parts 35a and 35b serve to restrict both axial and radial movement of the second springs 8 (discussed later). Abutment surfaces 36 that abut against or closely approach the end parts of the second springs 8 are formed on both circumferentially facing ends of the window holes 35.

Figure 3:
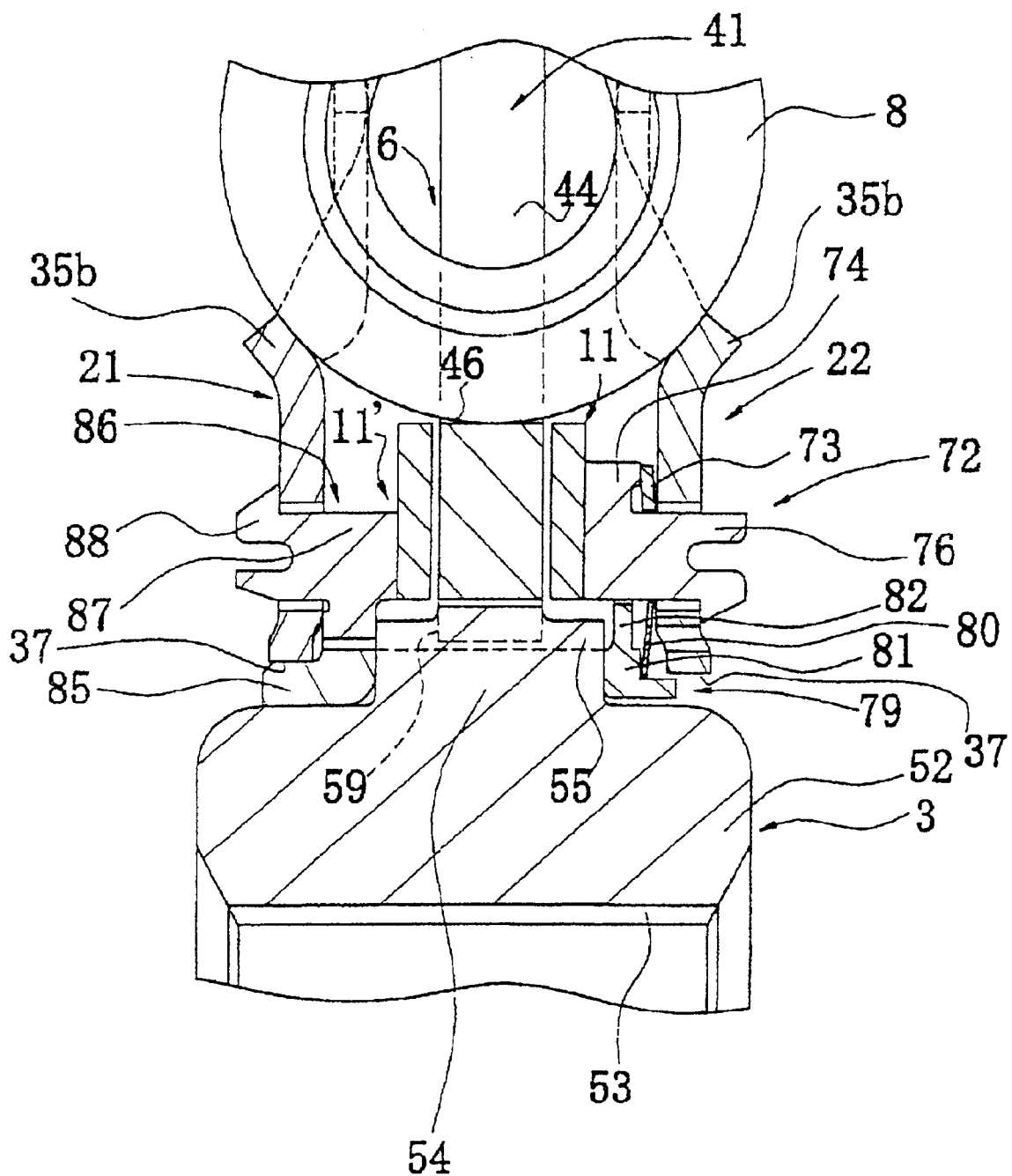
FIG. 3 is an enlarged partial view of the clutch disk assembly of FIG. 1.
Figure 4:
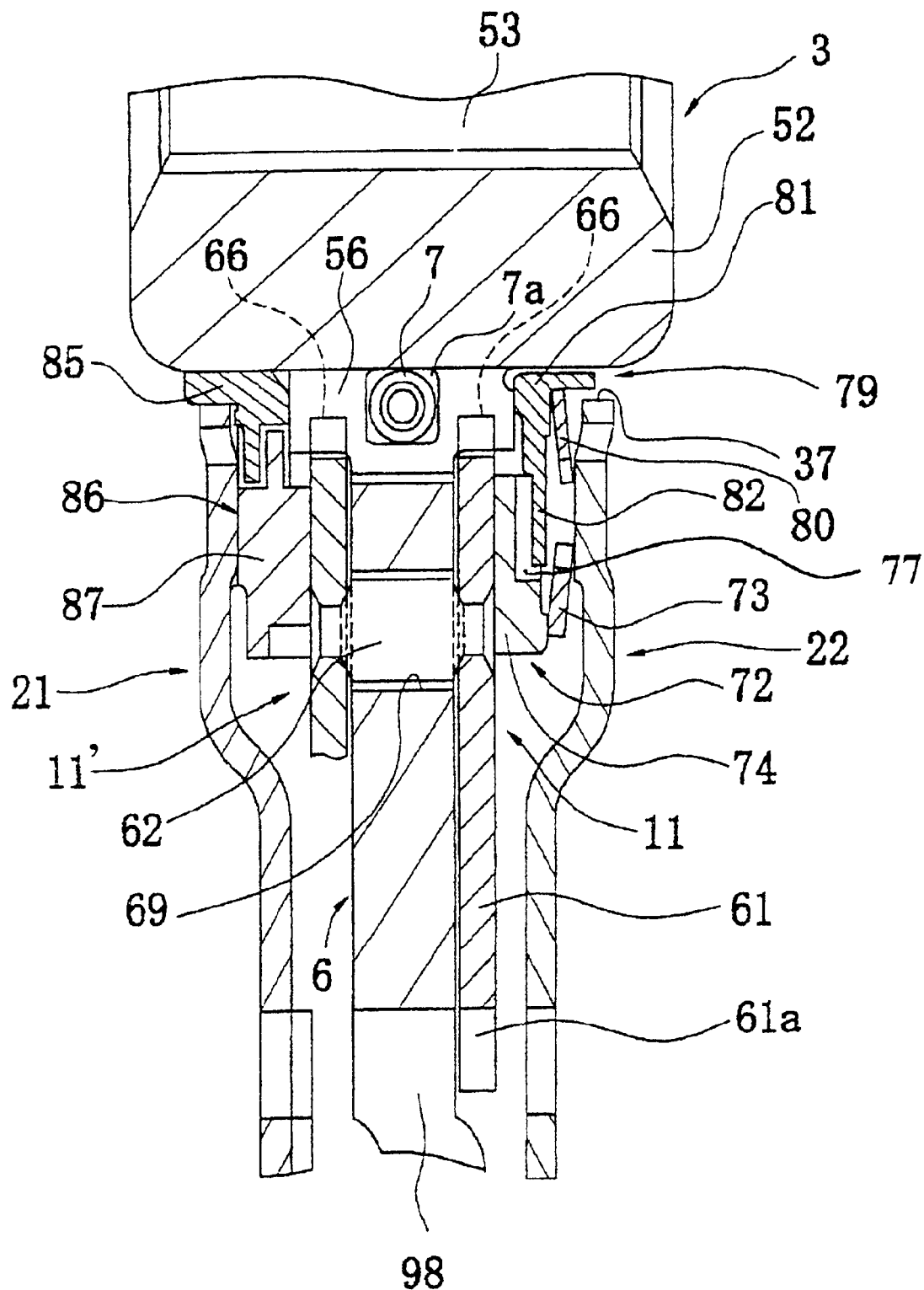
FIG. 4 is an alternate enlarged partial view of the clutch disk assembly of FIG. 1.

Referring now to FIGS. 3 and 4, a center hole 37 or internal edge is formed in both the clutch plate 21 and the retaining plate 22. The spline hub 3 is disposed inside the center hole 37. The spline hub 3 has a cylindrical boss 52 and a flange 54. The boss 52 extends in an axial direction. The flange 54 extends in a radial direction. An internal section of the boss 52 forms a spline hole 53 that meshes with a shaft (not shown) that extends from the transmission side. The flange 54 is provided with a plurality of external teeth 55 arranged in the rotational direction and notches 56 for housing the first springs 7 (discussed later). The notches 56 are preferably formed in two locations that are opposite each other in the radial direction.

A hub flange 6 is a disk-shaped member disposed radially outside of the spline hub 3 and axially between the clutch plate 21 and the retaining plate 22. The hub flange 6 is elastically connected to the spline hub 3 in the rotational direction via the first springs 7 and elastically connected to the input rotary member 2 via the second springs 8. As shown in detail in FIG. 7, a plurality of internal teeth 59 is formed on the internal edge of hub flange 6. The internal teeth 59 are disposed between the aforementioned external teeth 55 and are arranged with a prescribed spacing in the rotational direction. The external teeth 55 and the internal teeth 59 can touch against one another in the rotational direction. In short, the external teeth 55 and the internal teeth 59 form a first stopper 9 that serves to restrict the twisting angle between the spline hub 3 and the hub flange 6. The stopper mentioned here allows relative rotation to occur between the two members up to a prescribed angle but prevents relative rotation beyond the prescribed angle when the teeth 55 and 59 touch against each other. A first gap angle $\theta 1$ is secured between each external tooth 55 and each of the two internal teeth 59 located on both sides thereof in the rotational direction. A first gap angle $\theta 1p$ is formed between each external tooth 55 and the internal tooth 59 on the R2 side thereof, and a first gap angle $\theta 1n$ is formed between each external tooth 55 and the internal tooth 59 on the R1 side thereof. The sizes of the first gap angles $\theta 1p$ and $\theta 1n$ are different. The first gap angle $\theta 1p$ is preferably larger than the first gap angle $\theta 1n$.

Figure 5:
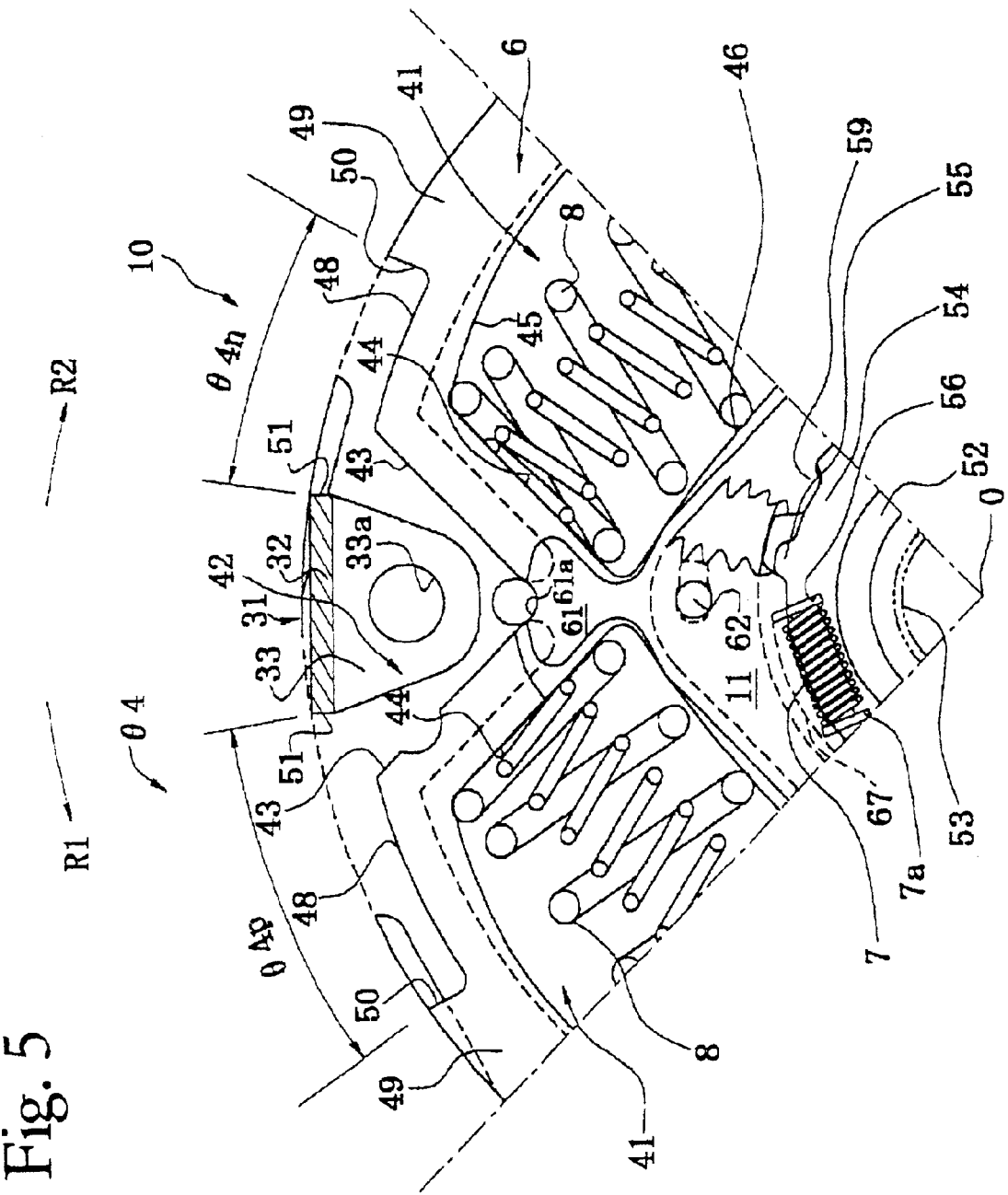
FIG. 5 is a partial elevational view illustrating twisting angles of components of the clutch disk assembly.

Furthermore, as seen in FIG. 5 notches 67 are formed on a internal edge of the hub flange 6 so as to correspond to the notches 56 of the flange 54. One first spring 7 is disposed inside each of the notches 56 and 67 to make preferably a total of two first springs 7. The first springs 7 are preferably low-rigidity coil springs. Further, the two first springs 7 act in parallel. The circumferentially facing ends of the first springs 7 engage with the circumferentially facing ends of the notches 56 and 67 via spring seats 7a. Referring again to FIG. 7, due to the structure described here, the spline hub 3 and the hub flange 6 compress the first springs 7 in the rotational direction within the range of the first gap angles $\theta 1$ when they rotate relative to each other.

Figure 6:
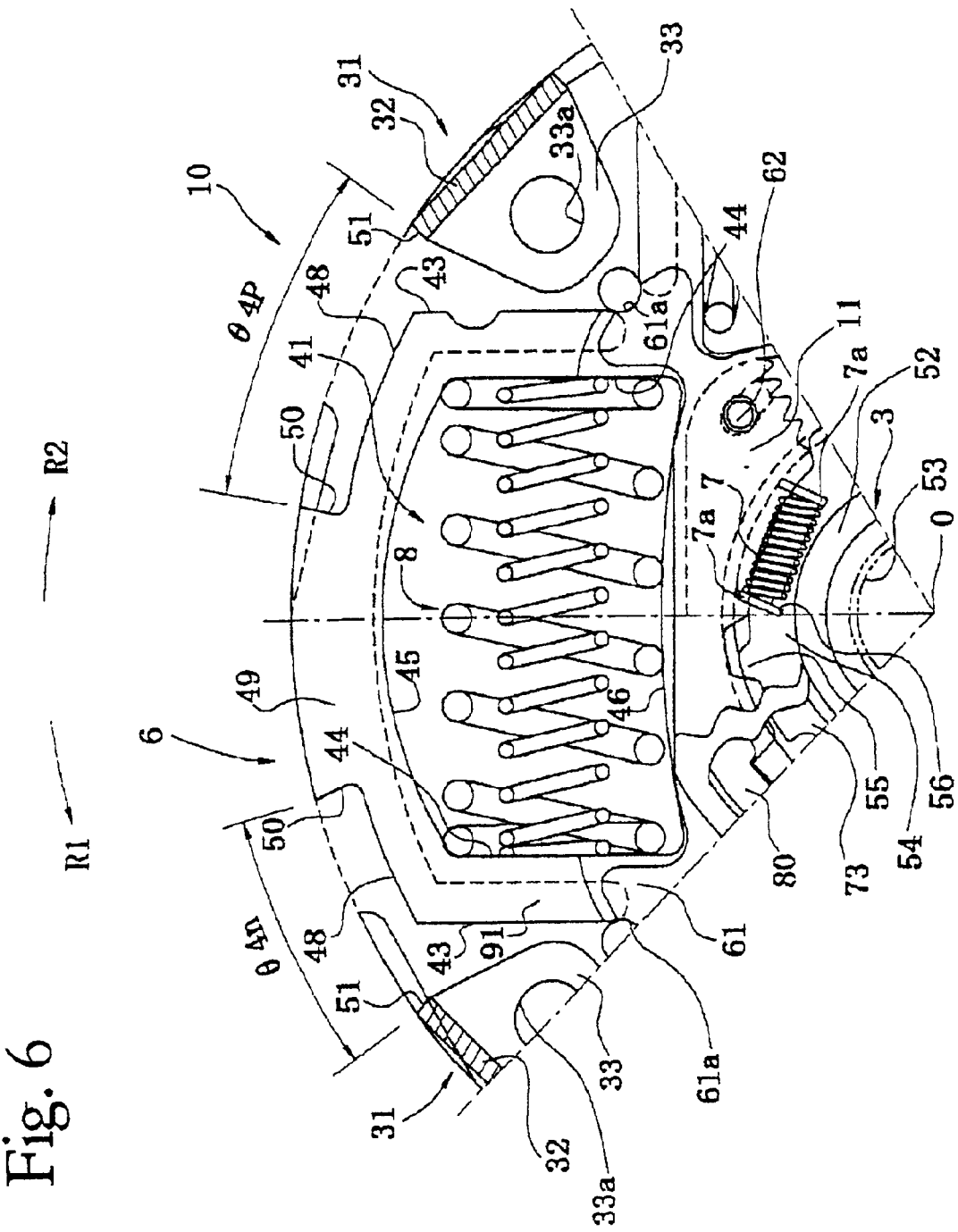
FIG. 6 is an alternate partial elevational view illustrating twisting angles of the components of the clutch disk assembly.

Referring again to FIGS. 1 and 2, there are preferably four window holes 41 that are formed in the hub flange 6 with equal spacing in the rotational direction. The window holes 41 are shaped so as to extend lengthwise in the rotational direction. As shown in FIGS. 5 and 6, the edges of window holes 41 have abutment parts 44 on both circumferentially facing ends. An outside part 45 is located farther outward of the abutment parts 44 in the radial direction. An inside part 46 is located inward of the abutment parts 44 in the radial direction. The outside part 45 is continuous and closes the outside section of the window hole 41. The inside part 46 closes the inside section of the window hole 41. The inside part 46 is preferably continuous. It is also acceptable, however, for a portion of the outside section of window hole 41 to be shaped so as to open outwardly in the radial direction. A notch 42 is formed in the hub flange 6 circumferentially between each of the window holes 41. The notches 42 are fan-shaped and oriented such that their length in the circumferential direction increases as one moves outward in the radial direction. The notches 42 also have edge faces 43 on both circumferentially facing sides.

A projection 49 is formed on the radially facing outside portion of each section where a window hole 41 is formed. In other words, the projections 49 extend outward in the radial direction from an outside edge 48 of the hub flange 6. The projections 49 extend lengthwise in the rotational direction and have stopper faces 50.

The second springs 8 are elastic members, i.e., springs, that are used in the damper mechanism of the clutch disk assembly 1. Each second spring 8 preferably has one pair of concentrically arranged coil springs. The second springs 8 are larger than the first springs 7 and also have a large spring constant. The second springs 8 are housed inside the window holes 41 and 35. The circumferentially facing ends of the second springs 8 touch against or closely approach the abutment parts 44 of the window holes 41 and abutment surfaces 36. Referring to FIGS. 1 and 2, the torque of the plates 21 and 22 can be transmitted to the hub flange 6 through the second springs 8. When the plates 21 and 22 rotate with respect to the hub flange 6, the second springs 8 are compressed therebetween. More specifically, each of the second springs 8 is compressed in the rotational direction between the abutment surface 36 at one end and the abutment part 44 at the opposite end. When this occurs, the four second springs 8 act in parallel.

The plate-like coupling parts 31 are provided in four locations around the outside edge of the retaining plate 22 and are spaced equally in the rotational direction. The plate-like coupling parts 31 serve to connect the clutch plate 21 and the retaining plate 22 together. The plate-like coupling parts 31 also form a portion of the stopper of the clutch disk assembly 1 (as discussed later). The plate-like coupling parts 31 are plate-like members formed integrally on the retaining plate 22 and have a prescribed width in the rotational direction. The plate-like coupling parts 31 are disposed circumferentially between the window holes 41, i.e., in positions corresponding to notches 42. Each of the plate-like coupling parts 31 has a stopper part 32 and a fastening part 33. The stopper part 32 extends in the axial direction from the outside edge of the retaining plate 22. The fastening part 33 extends in a radially inward direction from stopper part 32. The stopper parts 32 extend from the outside edge of the retaining plate 22 toward the clutch plate 21. The fastening parts 33 are bent radially inward from the end portion of the stopper parts 32. Each stopper part 32 has stopper faces 51 on both circumferentially facing sides thereof. The radial position of the fastening parts 33 corresponds to the outside portion of the window holes 41. The circumferential position of the fastening parts 33 is between adjacent window holes 41 in the rotational direction. As seen in FIGS. 5 and 6, as a result, the fastening parts 33 are disposed so as to correspond to notches 42 of hub flange 6. The notches 42 are larger than fastening parts 33. Consequently, during assembly the fastening parts 33 can move through the notches 42 when the retaining plate 22 is moved in the axial direction with respect to the clutch plate 21. As seen in FIG. 1, the fastening parts 33 are parallel to the coupling parts 24c of the cushioning plate 24 and abut there against from the transmission side. Referring to FIGS. 1 and 5, a hole 33a is formed in each fastening part 33 and one of the aforementioned rivets 27 is inserted through each hole 33a. The rivets 27 connect the fastening parts 33, the clutch plate 21, and the cushion plate 24 together as a single unit. Setting holes 34 for setting the rivets are provided in the retaining plate 22 at positions corresponding to the fastening parts 33.

Next, the second stopper 10 is discussed. The second stopper 10 has stopper parts 32 of the plate-like coupling parts 31 and projections 49. The second stopper 10 is a mechanism that allows hub flange 6 and the input rotary member 2 to undergo relative rotation up to a fourth gap angle θ4, but prevents relative rotation of the two members beyond the gap angle when the twisting angle closes the fourth gap angle θ4. When relative rotation occurs within the range of the fourth gap angle θ4, the second springs 8 are compressed between the hub flange 6 and the input rotary member 2. More specifically, a fourth gap angle θ4p is formed between each projection 49 and the stopper part 32 on the R2 side thereof, and a fourth gap angle θ4n is formed between each projection 49 and the stopper part 32 on the R1 side thereof. The size of the fourth gap angle θ4p differs from the size of fourth gap angle θ4n. The fourth gap angle θ4p is preferably larger than the fourth gap angle θ4n.

Figure 7:
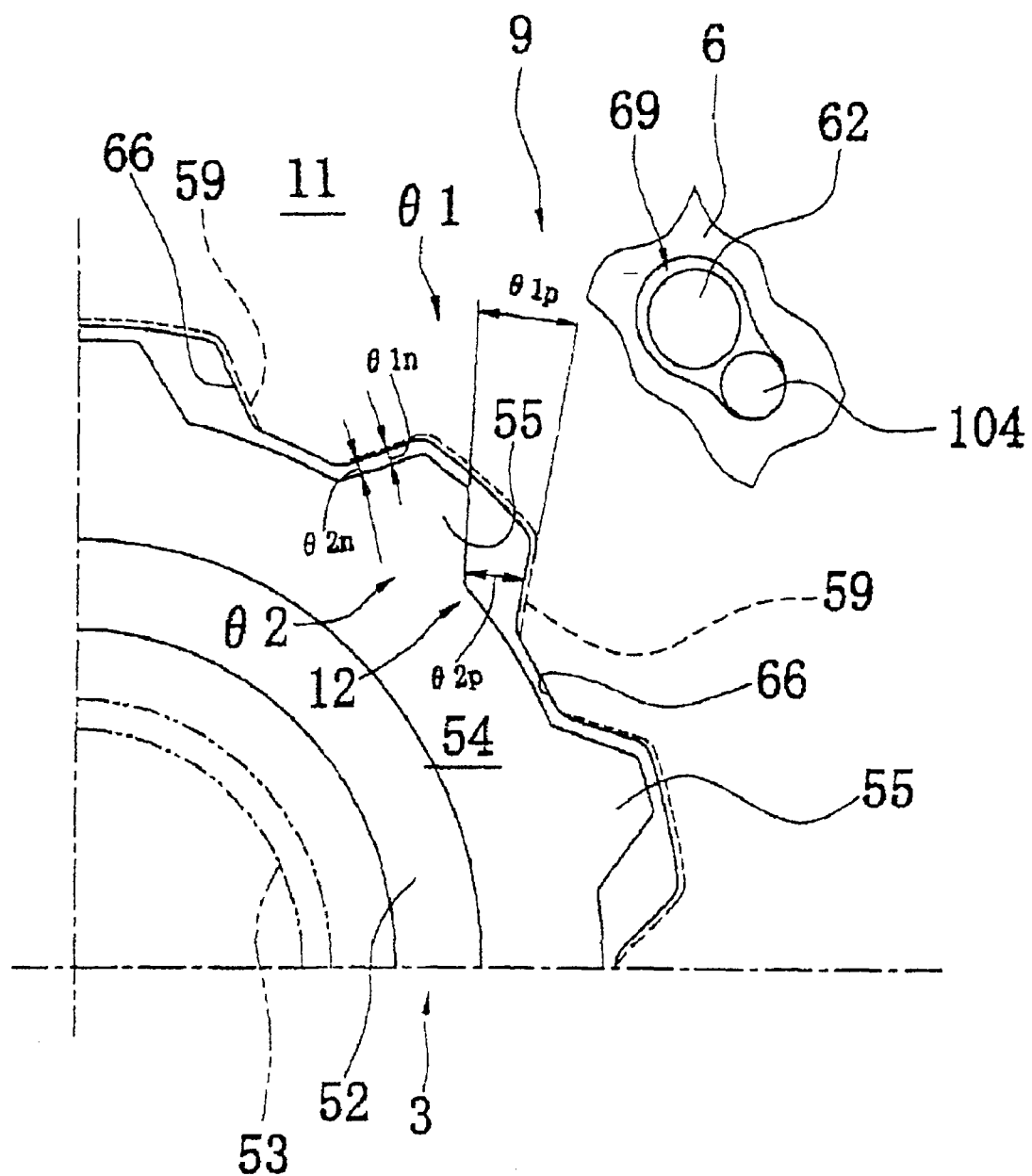
FIG. 7 is another alternate partial elevational view illustrating the twisting angles of the components of the clutch disk assembly.

Referring now to FIGS. 1 and 10, the friction plates 11 and 11' are a pair of plate members that are arranged radially outside the spline hub 3. The friction plate 11' is arranged between the clutch plate 21 and the hub flange 6. The friction plate 11 is arranged between the hub flange 6 and the retaining plate 22. The friction plates 11 and 11' are plate members shaped like an annular disk and form a portion of the damper section 4 between the input rotary member 2 and the spline hub 3. As best seen in FIG. 7, a plurality of internal teeth 66 is formed on the internal edges of the friction plates 11 and 11'. The internal teeth 66 are disposed so as to overlap with the internal teeth 59 of the hub flange 6 in the axial direction. As shown in detail in FIG. 7, the internal teeth 66 are wider in the circumferential direction than the internal teeth 59. Both ends of each of the internal teeth 66 protrude beyond the ends of the internal teeth 59 in the circumferential direction. The internal teeth 66 are disposed so as to have a prescribed gap with respect to the external teeth 55 of the spline hub 3 in the rotational direction. In other words, the spline hub 3 and the friction plates 11 and 11' can undergo relative rotation within the range of this gap. The external teeth 55 and the internal teeth 59 form a third stopper 12 that restricts the relative rotation angle between the spline hub 3 and friction plates 11 and 11'. That is, as shown in FIG. 7, a second gap angle θ2 is secured between the external teeth 55 and the internal teeth 66. More specifically, a second gap angle θ2p is formed between each external tooth 55 and the internal tooth 66 on the R2 side thereof. A second gap angle θ2n is formed between each external tooth 55 and the internal tooth 66 on the R1 side thereof. The second gap angle θ2p is preferably larger than the second gap angle θ2n. Meanwhile, the second gap angle θ2p is preferably smaller than the first gap angle θ1p. Further, the second gap angle θ2n is preferably smaller than the first gap angle θ1n.

As seen in FIGS. 4 and 5, between the pair of friction plates 11 and 11', the friction plate 11, which is disposed closer to the retaining plate 22, has a plurality of protrusions 61 that extends outward in the radial direction. The protrusions 61 are arranged between the window holes 41 of the hub flange 6. A semicircular positioning notch 61a is formed at the tip of each of the window holes 41. The notches 61a correspond to positioning notches 98 formed in hub flange 6 and positioning holes formed in the plates 21 and 22.

Figure 9:
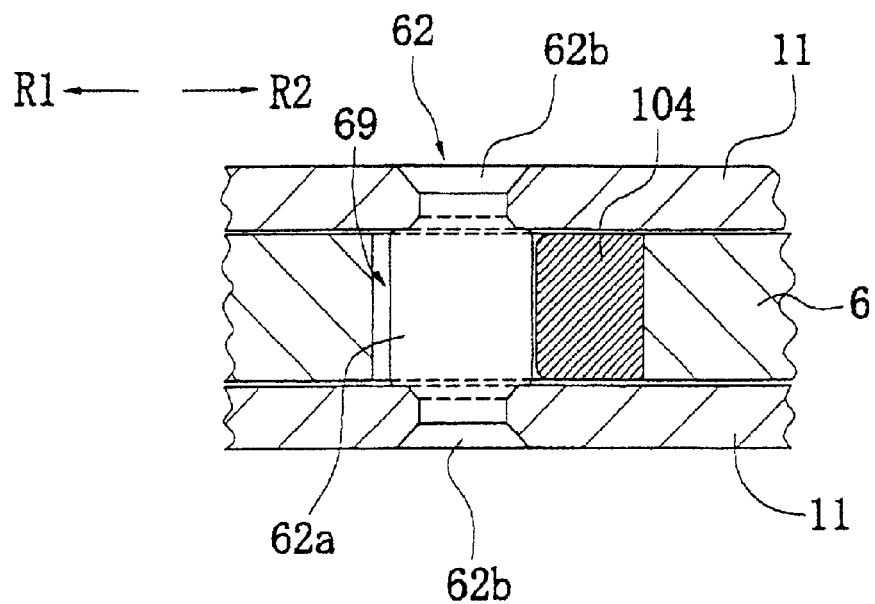
FIG. 9 is a cross-sectional view of the pins and holes taken along a line IX—IX of FIG. 8.

As shown in FIGS. 4 and 9, a plurality of stud pins 62 serve to prevent the two friction plates 11 and 11' from rotating relative to each other. The stud pins 62 also serve to establish the axial positioning of the two friction plates 11 and 11' with respect to each other. Each stud pin 62 has a body section 62a and head sections 62b that extend from both ends of body part 62a in the axial direction. The body section 62a is cylindrical in shape and extends in the axial direction. Each of the pair of friction plates 11 and 11' is prevented from approaching the other in the axial direction by their contact with the end faces of the body parts 62a of the stud pins 62. The head sections 62b of stud pins 62 are inserted through holes formed in the friction plates 11 and 11'. Further, the head sections 62b sandwich the friction plates 11 and 11' between themselves and the body section 62a. Consequently, the pair of friction plates 11 and 11' cannot separate from each other in the axial direction. Thus, the stud pins 62 serve to couple the pair of friction plates 11 and 11' together and rotate integrally with friction plates 11 and 11'. The stud pins 62 also determine the axial spacing between the friction plates 11 and 11'. Furthermore, the members used to couple the pair of friction plates 11 together are not limited to the stud pins 62. It is also acceptable to employ a structure using a different member or a portion of the friction plates 11 and 11'.

As shown in FIG. 9, the thickness of the hub flange 6 is smaller than the axial gap between pair of friction plates 11 and 11'. A tiny gap is secured between each axially facing surface of hub flange 6 and each respective friction plates 11 and 11'.

Figure 8:
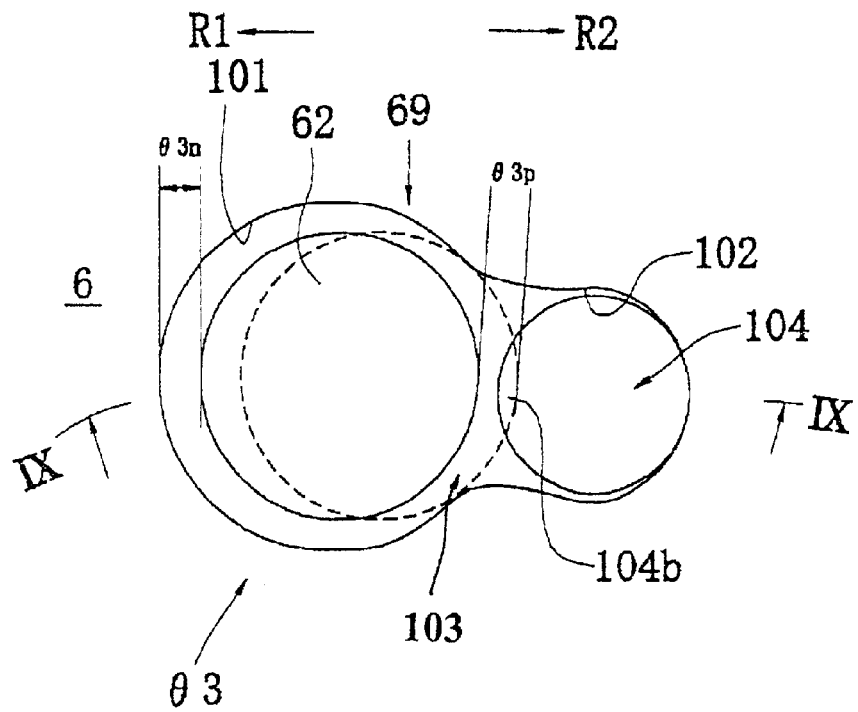
FIG. 8 is an enlarged elevational view illustrating the relationship between pins and holes in a hub flange of the clutch disk assembly.

As shown in FIGS. 7 and 8, holes 69 are provided in the hub flange 6 at positions corresponding to the stud pins 62. Each hole 69 preferably has two holes 101 and 102. The two holes 101 and 102 are aligned in the rotational direction and arranged so as to form a single hole. The first hole 101 is disposed on the R1 side, and the second hole 102 is disposed on the R2 side. The holes 101 and 102 are roughly circular but their adjacent edges overlap. The diameter of the first hole 101 is preferably larger than the diameter of second hole 102. The overall form of each hole 69 is preferably gourd-shaped and extends lengthwise in the rotational direction.

As seen in FIG. 9, the body section 62a of each stud pin 62 is disposed inside the first hole 101 of the hole 69. The stud pins 62 can move in the rotational direction inside the first holes 101 because the diameter of body section 62a is smaller than the diameter of the first holes 101. Each hole 69 is provided with a protruding section 103. The protruding section 103 has a gap and walls. The protruding section 103 represents the intersection of the first hole 101 with the second hole 102. The length of the gap of the protruding section 103 in the radial direction is preferably smaller than the diameter of the first hole 101. Further, the length of the gap of the protruding section 103 in the radial direction is preferably smaller than the diameter of the body section 62a. Meanwhile, since the diameter of the body section 62a of the stud pin 62 is larger than the gap of the protruding section 103, the movement of the stud pin 62 is halted when it contacts walls of the protruding section 103, i.e., the wall on the R2 side of the first hole 101, as indicated by the dotted line shown in FIG. 8.

A third gap angle θ3 is secured circumferentially between the body section of each stud pin 62 and both circumferentially facing edges of the internal face of each first hole 101. As indicated in FIG. 10, this arrangement forms a fourth stopper 14. More specifically, as shown in FIG. 8, a third gap angle θ33p is formed between each stud pin 62 and the R2 side of the internal face of the first hole 101, i.e. the walls of the protruding section 103, and a third gap angle θ3n is formed between each stud pin 62 and the R1 side of the internal face of the first hole 101.

Elastic members 104 are disposed inside the second holes 102. The elastic members 104 serve to soften the impact when the stud pins 62 move to the R2 side of the first holes 101. The elastic members 104 can be made of such materials as rubber or elastic resin. However, it is preferred that the elastic member 104 be made of a thermoplastic polyester elastomer. The shape of the elastic members 104 is roughly cylindrical. As shown in FIG. 9, the axial length of elastic members 104 is roughly the same as the thickness of the hub flange 6 and is smaller than the axial gap between the pair of friction plates 11 and 11'. Thus, a relatively tiny gap is secured between each axially facing surface of the elastic members 104 and each of the respective friction plates 11 and 11'. The elastic members 104 are shaped roughly the same as the second holes 102. There is a slight gap between the elastic members and the wall face of second holes 102. Therefore, the elastic members 104 can move in the axial direction with respect to hub flange 6. Even when the elastic members 104 have moved as far as possible in the R2 direction away from the first hole 101, a portion of each elastic member 104, i.e., a contact section 104b, is positioned in the region where, or near where, the first hole 101 overlaps the second hole 102. Consequently, the stud pins 62 can touch against elastic members 104 when they move to the R2 side of first holes 101.

Next, the members that constitute the friction generating mechanism are described. Referring to FIGS. 3 and 4, a second friction washer 72 is disposed between the inner circumferential portion of the friction plate 11, which is on the transmission side, and an inner circumferential portion of the retaining plate 22. The second friction washer 72 chiefly has a main body 74 and is preferably made of resin. The friction surface of the main body 74 touches against the surface of the transmission side friction plate 11 that faces the transmission. An engaging part 76 axially extends from an inner circumferential portion of main the body 74 toward the transmission. The engaging part 76 engages with the retaining plate 22 such that relative rotation cannot occur, and also secures the retaining plate 22 in the axial direction. A plurality of recessions 77 is formed on the transmission side of an inner circumferential portion of the main body 74. A second cone spring 73 is disposed between the main body 74 and the retaining plate 22. The second cone spring 73 is arranged to be compressed between the main body 74 of the second friction washer 72 and the retaining plate 22. As a result, the friction surface of the second friction washer 72 is pressed firmly against the friction plate 11. A first friction washer 79 is disposed between the flange 54 and an inner circumferential portion of the retaining plate 22. Thus, the first friction washer 79 is disposed radially inside of the second friction washer 72 and radially outside of the boss 52. The first friction washer 79 is preferably made of resin. The first friction washer 79 chiefly has an annular main body 81 and a plurality of projections 82. The plurality of projections 82 extends outward in the radial direction from the annular main body 81. The main body 81 touches against the flange 54. The plurality of projections 82 engages the recessions 77 of the second friction washer 72 such that relative rotation cannot occur. As a result, the first friction washer 79 can rotate integrally with the retaining plate 22 through its engagement with the second friction washer 72. A first cone spring 80 is disposed between the first friction washer 79 and the inner circumferential portion of the retaining plate 22. The first cone spring 80 is arranged such that it is compressed in the axial direction between the first friction washer 79 and the inner circumferential portion of the retaining plate 22. Furthermore, the force exerted by the first cone spring 80 is designed to be smaller than the force exerted by the second cone spring 73. The first friction washer 79 is made of a material having a lower coefficient of friction than the second friction washer 72. Consequently, the friction or hysteresis torque generated by first friction washer 79 is much smaller than the friction generated by second friction washer 72.

A third friction washer 85 and a fourth friction washer 86 are disposed between an inner circumferential portion of the clutch plate 21 and both the flange 54 and an inner circumferential portion of the friction plate 11. The third friction washer 85 and the fourth friction washer 86 are annular members made preferably of resin. The third friction washer 85 engages an internal edge of the clutch plate 21 such that relative rotation cannot occur. Further, an internal surface of the third friction washer 85 touches against the external surface of the boss 52 such that it can slide thereon. Thus, the clutch plate 21 is positioned in the radial direction with respect to the boss 52 by means of the third friction washer 85. The third friction washer 85 touches against the side of the flange 54 that faces the engine in the axial direction. The fourth friction washer 86 is disposed radially outside of the third friction washer 85. The fourth friction washer 86 has an annular main body 87 and a plurality of engaging parts 88. The plurality of engaging parts 88 axially extends from the annular main body 87 toward the engine in the axial direction. The main body 87 has a friction surface that touches against the friction plate 11', which is closer to the engine in the axial direction than the friction plate 11. The engaging parts 88 engage with holes formed in the clutch plate 21 such that relative rotation cannot occur between the fourth friction washer 86 and the clutch plate 21. The engaging parts 88 have claw parts that touch against the surface of the clutch plate 21 that faces toward the engine in the axial direction. The third friction washer 85 and the fourth friction washer 86 engage with each other such that they cannot rotate relative to each other. The third friction washer 85 and the fourth friction washer 86 are separate members. The fourth friction washer 86 is made of a material having a higher friction coefficient than the material that makes up the third friction washer 85.

In the previously discussed friction mechanism, the large friction mechanism 13 (friction mechanism) generates a relatively high hysteresis torque. The large friction mechanism 13 is formed between the friction plate 11 and the second friction washer 72, and the friction plate 11' and the fourth friction washer 86, respectively. Meanwhile, a small friction mechanism 15 that generates a relatively low hysteresis torque is formed between the flange 54 and the first friction washer 79, and the flange 54 and the third friction washer 85.

Next, the constituent features of the clutch disk assembly 1 are described further using FIG. 10. FIG. 10 is a mechanical circuit diagram illustrating the damper mechanism function of the clutch disk assembly 1. This mechanical circuit diagram illustrates in a schematic manner the relationships between the members of the damper mechanism in terms of the rotational direction. Consequently, members that rotate as a single unit are treated as one member.

As FIG. 10 clearly illustrates, a plurality of members is arranged between the input rotary member 2 and the spline hub 3 in order to construct the damper section 4. The hub flange 6 is disposed rotationally between the input rotary member 2 and the spline hub 3. The hub flange 6 is elastically coupled to the spline hub 3 in the rotational direction via the first springs 7. The first stopper 9 is also formed between the hub flange 6 and the spline hub 3. The first springs 7 can be compressed over the first gap angle $\theta 1p$ of the first stopper 9. The hub flange 6 is elastically coupled to the input rotary member 2 in the rotational direction via the second springs 8. Also, the second stopper 10 is formed between the hub flange 6 and the input rotary member 2. The second springs 8 can be compressed over the fourth gap angle $\theta 4p$ of the second stopper 10. As previously discussed, the input rotary member 2 and the spline hub 3 are coupled together elastically in the rotational direction by means of the first springs 7 and the second springs 8, which are arranged to operate substantially in series. Thus, the hub flange 6 functions as an intermediate member disposed between two different types of springs, the first springs 7 and the second springs 8. This structure can be viewed as a structure in which a first damper having the first springs 7, which are arranged in parallel with each other, and the first stopper 9 is arranged in series with a second damper having the second springs 8, which are also arranged in parallel with each other, and a second stopper 10. The total rigidity of the first springs 7 is set to be far less than the total rigidity of the second springs 8. Consequently, the second springs 8 are hardly compressed at all in the rotational direction in the range of twisting angles up to the first gap angle $\theta 1$.

The friction plates 11 and 11' are disposed rotationally between the input rotary member 2 and the spline hub 3. The friction plates 11 and 11' are arranged such that they can undergo relative rotation between the spline hub 3 and the hub flange 6. The third stopper 12 is formed between the friction plates 11 and 11' and the spline hub 3. The fourth stopper 14 is formed between the friction plates 11 and 11' and the hub flange 6. Furthermore, the friction plates 11 and 11' are frictionally engaged with the input rotary member 2 in the rotational direction by means of the large friction mechanism 13. Thus, arranged between the input rotary member 2, the spline hub 3, and hub flange 6, the friction plates 11 and 11' form a frictional coupling mechanism 5.

Figure 16:
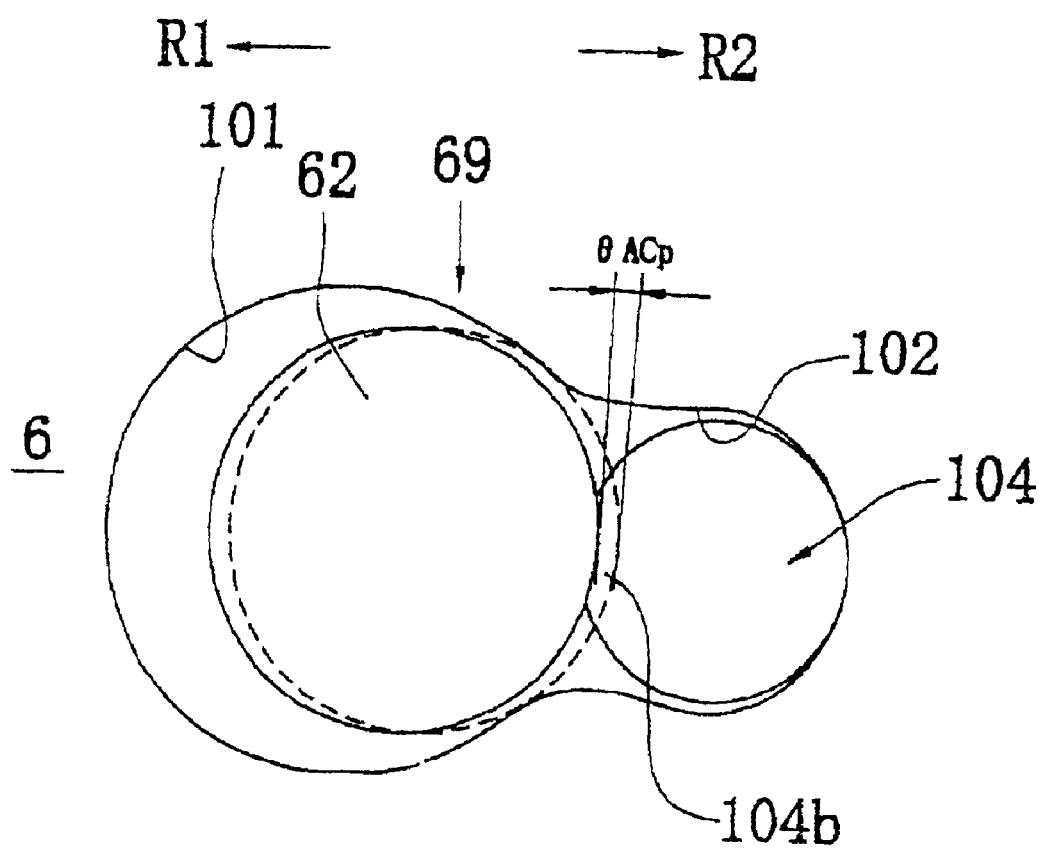
FIG. 16 is an enlarged partial view of FIG. 15 corresponding to FIG. 8.

Next, the relationships among the gap angles $\theta 1$ to $\theta 4$ of the damper mechanism shown in FIG. 10 are described. The gap angles are described here as viewed from the spline hub 3 toward the input rotary member 2 in the R2 direction. The first gap angle $\theta 1p$ of the first stopper 9 is the angular range over which the first springs 7 are compressed in the rotational direction. The fourth gap angle $\theta 4p$ of the second stopper 10 is the angular range over which the second springs 8 are compressed in the rotational direction. The sum of first gap angle $\theta 1p$ and the fourth gap angle $\theta 4p$ is the maximum twisting angle of the entire clutch disk assembly 1 when it functions as a damper mechanism in the positive direction. The value obtained when the difference between the first gap angle $\theta 1p$ and the second gap angle $\theta 2p$ is subtracted from third gap angle $\theta 3p$ is the magnitude of a positive-side second stage gap angle $\theta ACp$ (see FIGS. 14 and 16). The positive-side second stage gap angle $\theta ACp$ serves to prevent the large friction mechanism 13 from operating when small torsional vibrations are inputted while the damper mechanism is operating at the second stage on the positive side of the torsion characteristic. More specifically, the positive-side second-stage gap angle $\theta ACp$ is formed between the R2 side of the stud pin 62 and the R2 side of the first hole 101. The magnitude of the positive-side second stage gap angle $\theta ACp$ in this embodiment is 0.2 degree, which is much smaller than in the prior art, but it is also acceptable if the positive-side second stage gap angle were to be larger.

As shown in FIG. 10, a small friction mechanism 15 is provided between the input rotary member 2 and the spline hub 3. The small friction mechanism 15 is constituted such that sliding always occurs when the input rotary member 2 and the spline hub 3 rotate relative to each other. In this embodiment the small friction mechanism 15 chiefly has the first friction washer 79 and third friction washer 85, but it is also acceptable to use other members. Additionally, depending on the situation, it is preferred that the hysteresis torque generated by small friction mechanism 15 be as small as possible.

Next, the operation of the damper mechanism of the clutch disk assembly 1 is explained in detail using a plurality of mechanical circuit diagrams and a torsion characteristic curve diagram. The following explanation describes the positive side of the torsion characteristic, which corresponds to when the spline hub 3 being twisted in the R2 direction with respect to the input rotary member 2 from the neutral state shown in FIG. 10. Since the damper mechanism operates in a similar or substantially same manner on the negative side of the torsion characteristic, explanation of the negative side of the torsion characteristic is omitted.

Figure 11:
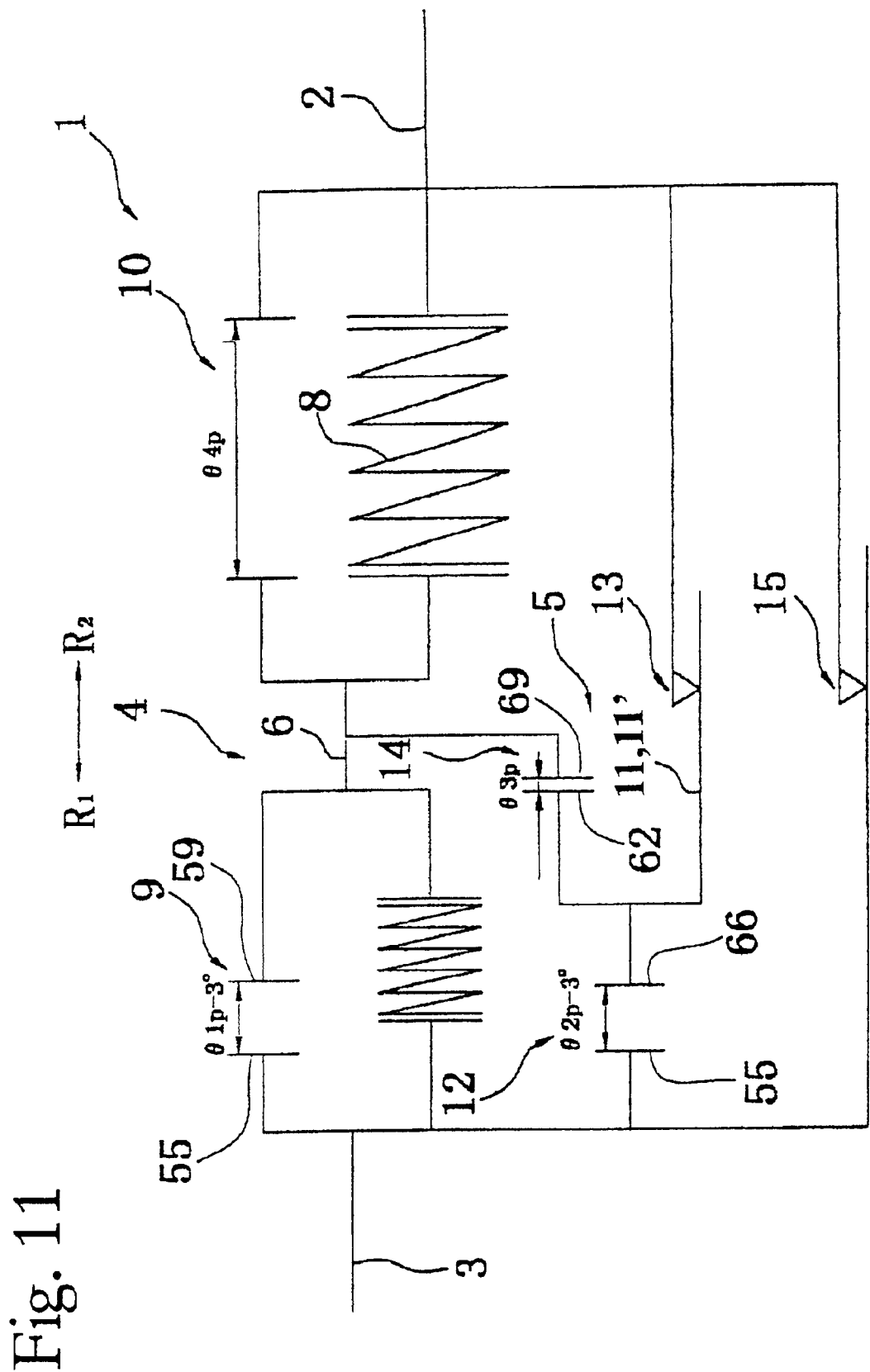
FIG. 11 is an alternate diagrammatical view of the mechanical circuit of the damper mechanism of the clutch disk assembly.
Figure 12:
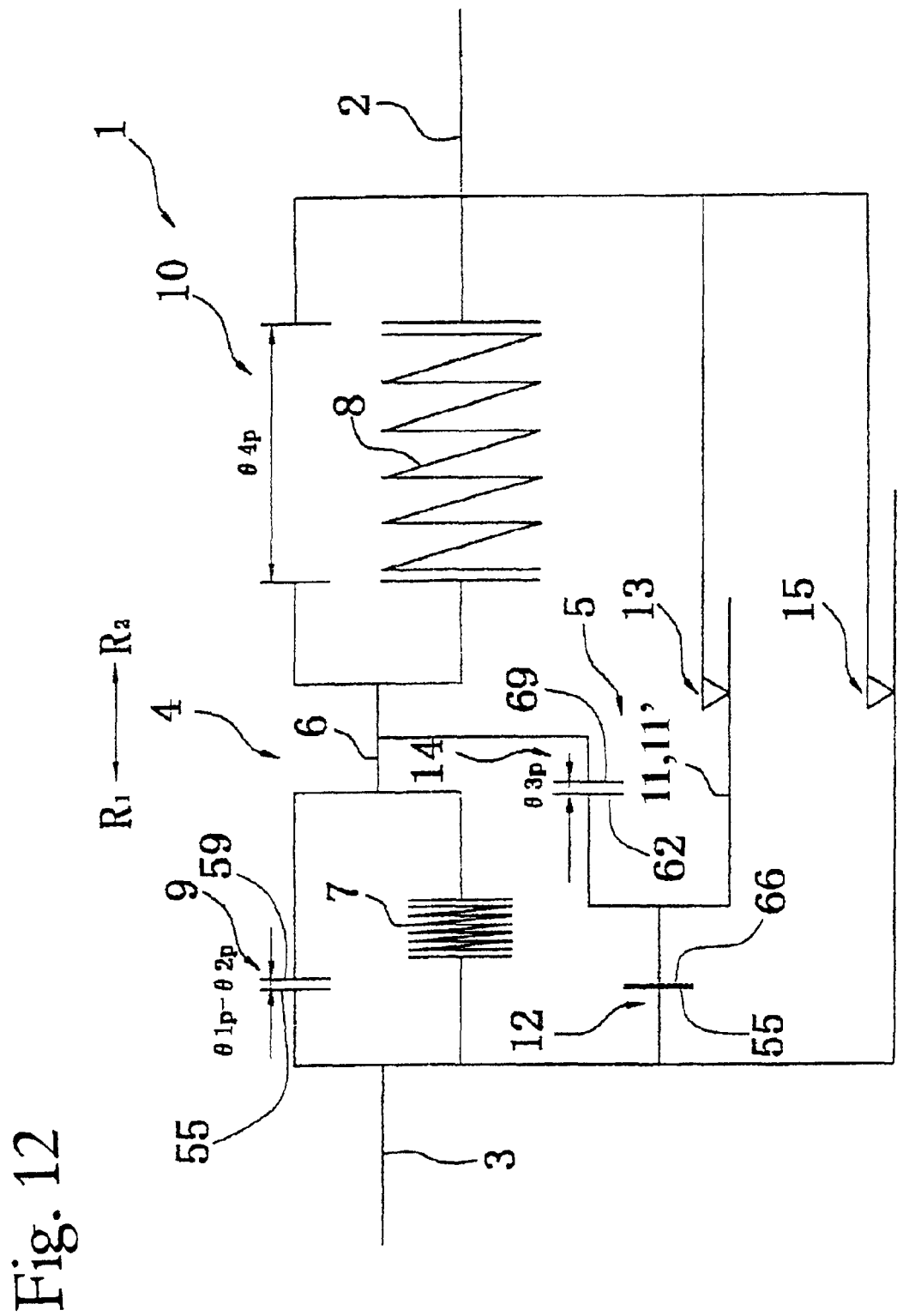
FIG. 12 is another diagrammatical view of the mechanical circuit diagram of the damper mechanism of the clutch disk assembly.
Figure 13:
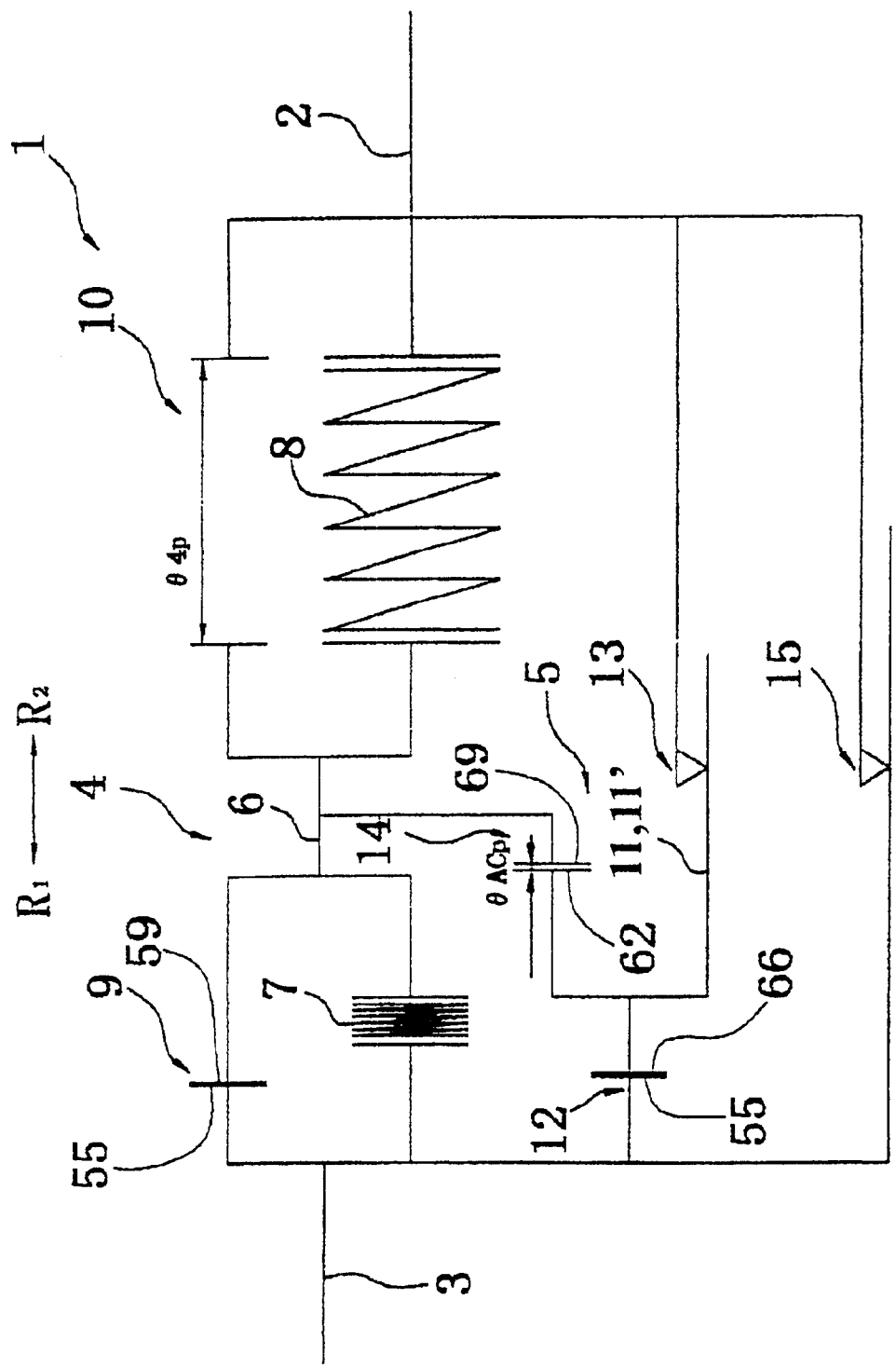
FIG. 13 is yet another diagrammatical view of the mechanical circuit diagram of the damper mechanism of the clutch disk assembly.

When the spline hub 3 is twisted in the R2 direction with respect to the input rotary member 2 from the neutral condition shown in FIG. 10, the input rotary member 2 is twisted in the R1 direction, i.e., the rotational drive direction, with respect to the spline hub 3. FIG. 11 shows the condition obtained when the spline hub 3 is rotated 3 degrees in the R2 direction from the condition shown in FIG. 10. During this shift, the first springs 7 are compressed in the rotational direction between the spline hub 3 and the hub flange 6, and sliding occurs in small friction mechanism 15. As a result, a torsion characteristic having low rigidity and low hysteresis torque is obtained, as illustrated by the torsion characteristic curve in FIG. 18. The gap angles of first stopper 9 and third stopper 12 both decrease by 3 degrees. When the spline hub 3 is twisted over the range of the second gap angle θ2p from the condition shown in FIG. 10, the mechanism shifts to the condition shown in FIG. 12. During this shift as well, the first springs 7 are compressed in the rotational direction between the spline hub 3 and the hub flange 6, and sliding occurs in the small friction mechanism 15. In FIG. 12, the spline hub 3 and the friction plates 11 and 11' are touching against each other in third stopper 12. Further, a gap angle equal to the difference between the first gap angle θ1p of the first stopper 9 and the second gap angle θ2p of the third stopper 12 is secured in the first stopper 9. When the spline hub 3 is twisted further in the R2 direction from the condition shown in FIG. 12, the friction plates 11 and 11' are rotationally displaced with respect to the hub flange 6. As a result, sliding occurs in the large friction mechanism 13 and the stud pins 62 are displaced in the R2 direction with respect to the holes 69. When the spline hub 3 is twisted through the angle θ1p–θ2p in the R2 direction from the condition shown in FIG. 12, in the first stopper 9, the external teeth 55 of the spline hub 3 touch against the internal teeth 59 of the hub flange 6 as shown in FIG. 13. Meanwhile, the gap in the fourth stopper 14 is represented by the positive-side second stage gap angle θACp. The positive-side second stage gap angle θACp is the angle obtained when the difference between first gap angle θ1p and second gap angle θ2p, is subtracted from third gap angle θ3p. When in this state, the stud pins 62 touch against the elastic members 104, and the elastic members 104 are compressed between the stud pins 62 and holes 69.

Figure 14:
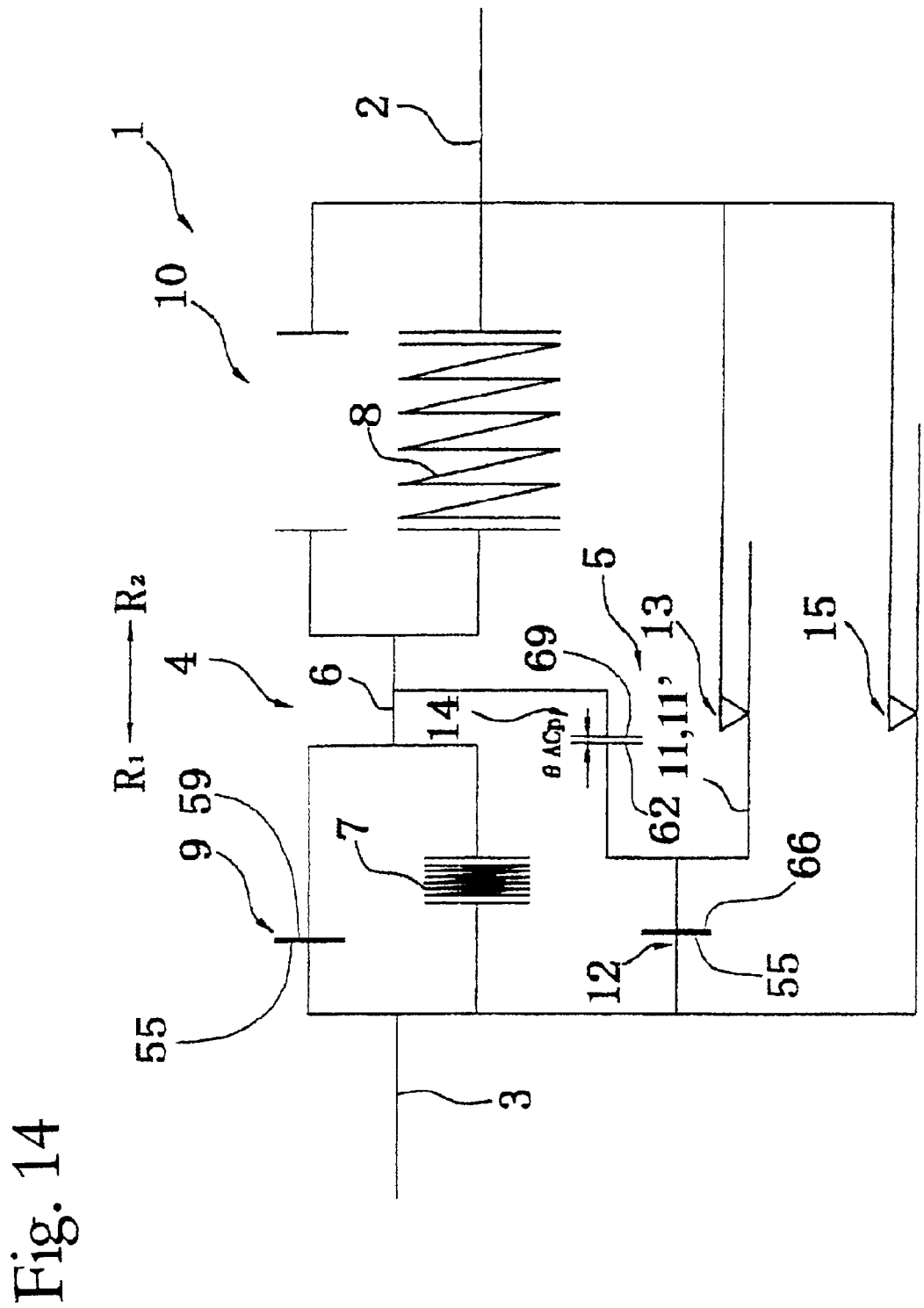
FIG. 14 is still another diagrammatical view of the mechanical circuit diagram of the damper mechanism of the clutch disk assembly.

When the spline hub 3 is twisted still further in the R2 direction from the condition shown in FIG. 13, the mechanism shifts to the condition shown in FIG. 14. During this shift, the first springs 7 are not further compressed because the teeth of the first stopper 9 are touching one another, thus preventing any further compression of the first springs 7. Meanwhile, the hub flange 6 compresses the second springs 8 against the input rotary member 2. Here, friction is generated in the large friction mechanism 13 because sliding occurs between the friction plates 11 and 11' and the input rotary member 2. As a result, a characteristic having high rigidity and high hysteresis torque is obtained. Furthermore, since both the hub flange 6 and the friction plates 11 and 11' rotate integrally with the spline hub 3 when the clutch disk assembly 1 is at this second-stage twisting angle, the positive-side second stage gap angle θACp is maintained between friction plates 11 and 11' and the hub flange 6.

Figure 19:
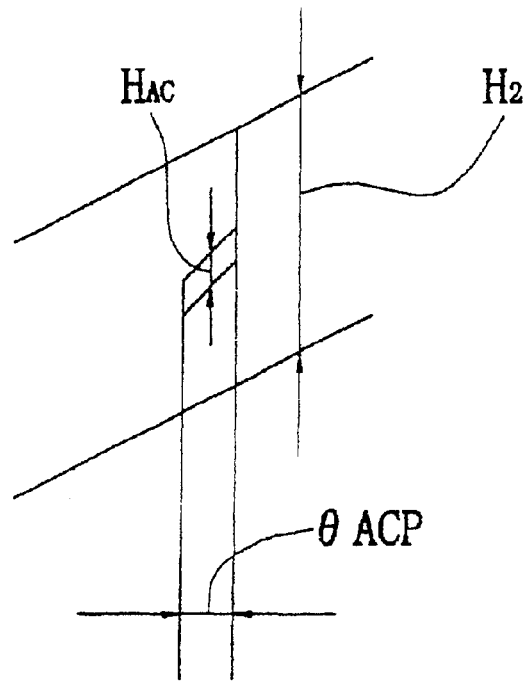
FIG. 19 is an enlarged partial view of FIG. 18 illustrating a rotational gap that is positioned in a positive and/or negative side second stage of the torsion characteristic curve of FIG. 18.

When small torsional vibrations caused by engine combustion fluctuations are transmitted while the clutch disk assembly 1 is in the state shown in FIG. 14, sliding does not occur in the large friction mechanism 13. However, the second springs 8 elongate from and return to their contracted condition within the range of the positive-side second stage gap angle θACp. Thus, the positive-side second stage gap angle θACp functions as a friction suppressing mechanism that prevents sliding from occurring in the large friction mechanism 13 when small torsional vibrations (i.e., vibrations involving torque levels below a prescribed torque and thus causing small twisting angles) occur while the damping mechanism is operating at the second stage on the positive side of the torsion characteristic. Therefore, as shown in FIG. 19, a hysteresis torque HAC that is smaller than the second stage hysteresis torque $H_2$ is obtained within the range of angle θACp. It is preferred that the hysteresis torque $H_{AC}$ be approximately one-tenth as large as the hysteresis torque $H_2$.

Figure 17:
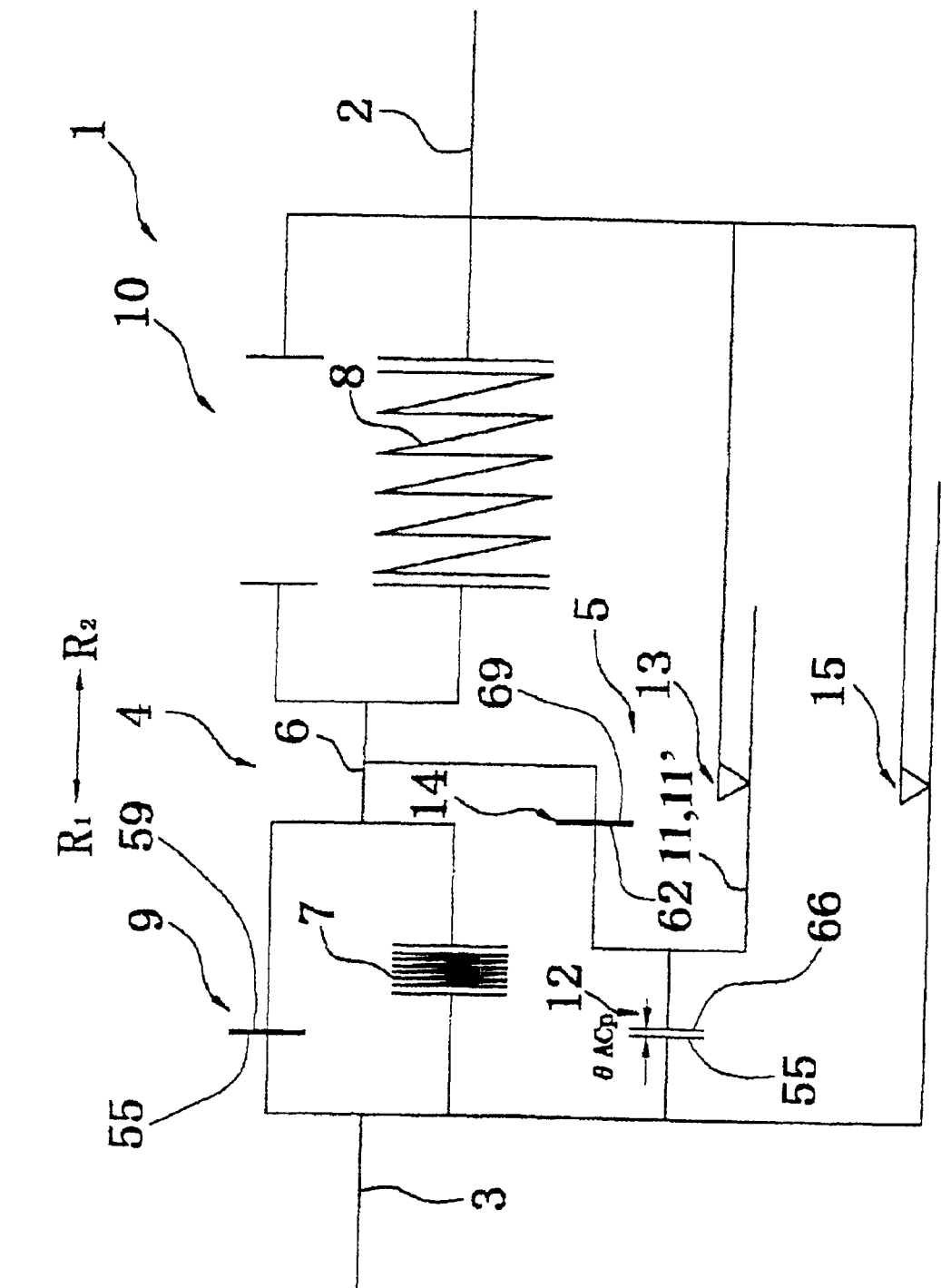
FIG. 17 is a diagrammatical view of the mechanical circuit of the damper mechanism of the clutch disk assembly.

When damping small torsional vibrations while operating at the second stage, the damper mechanism oscillates between the condition shown in FIG. 14 and the condition shown in FIG. 17. In FIG. 17, the damper mechanism is at the positive end of the positive-side AC angular range and the stud pins 62 have struck against holes 69 in the fourth stopper 14. In FIG. 14, the damper mechanism is at the negative end of the positive-side AC angular range and the external teeth 55 of the spline hub 3 strike against the internal teeth 66 of the friction plates 11 and 11' in the third stopper 12. More specifically, in FIG. 17, the stud pins 62 strike against the R2 side of the first holes 101, and in FIG. 14 the internal teeth 66 strike against the respective external teeth 55 located on the R1 side thereof. The impact of the stud pins 62 is softened because the elastic members 104 are arranged at the impact section. Consequently, the stud pins 62 and the holes 69 do not easily become worn and the prescribed twisting angle ACp on the positive-side second stage of the friction suppressing mechanism is prevented from becoming larger.

Figure 15:
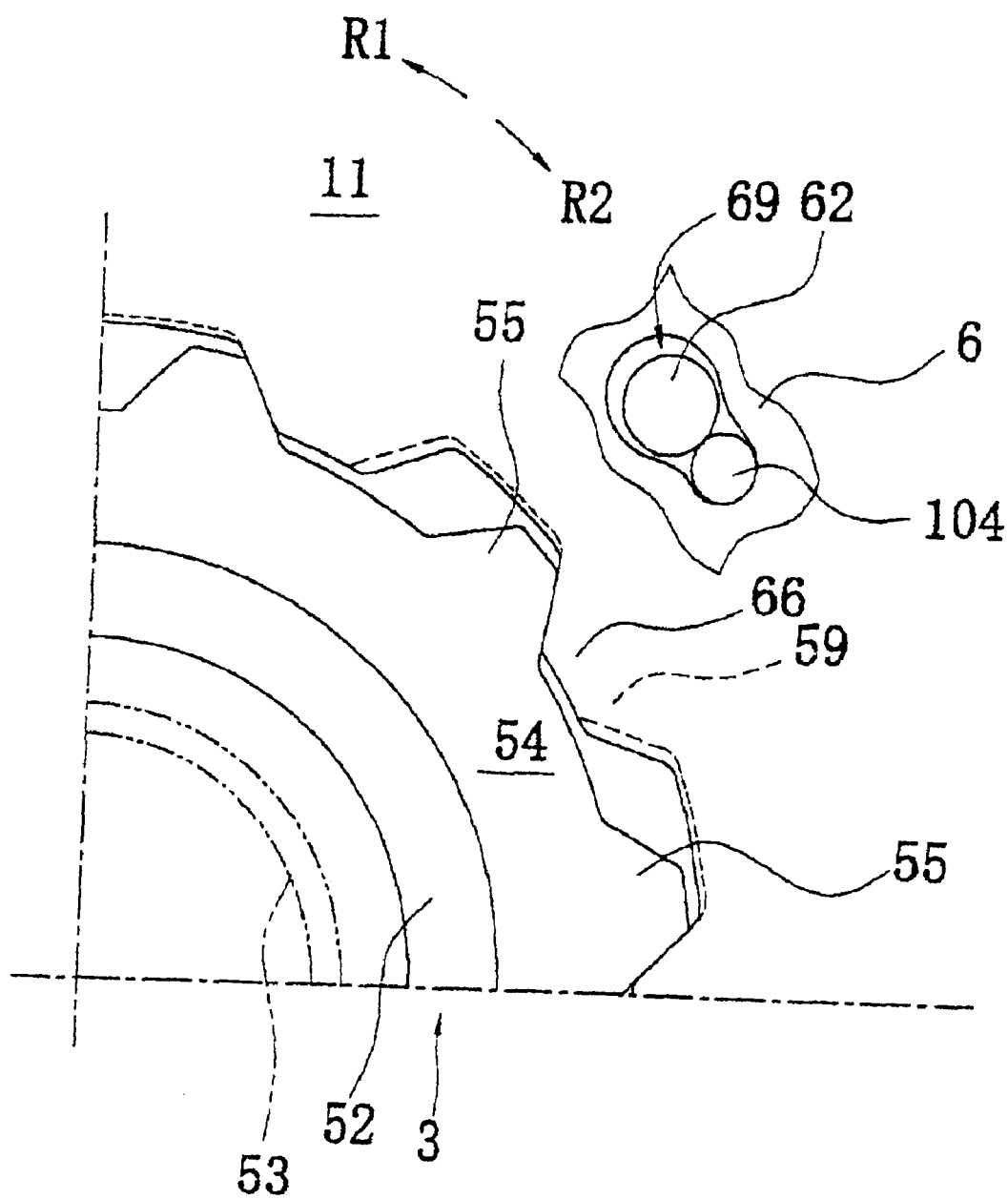
FIG. 15 is an elevational view illustrating the positions of the components when the clutch disk assembly is in the condition indicated by FIG. 14.
Figure 18:
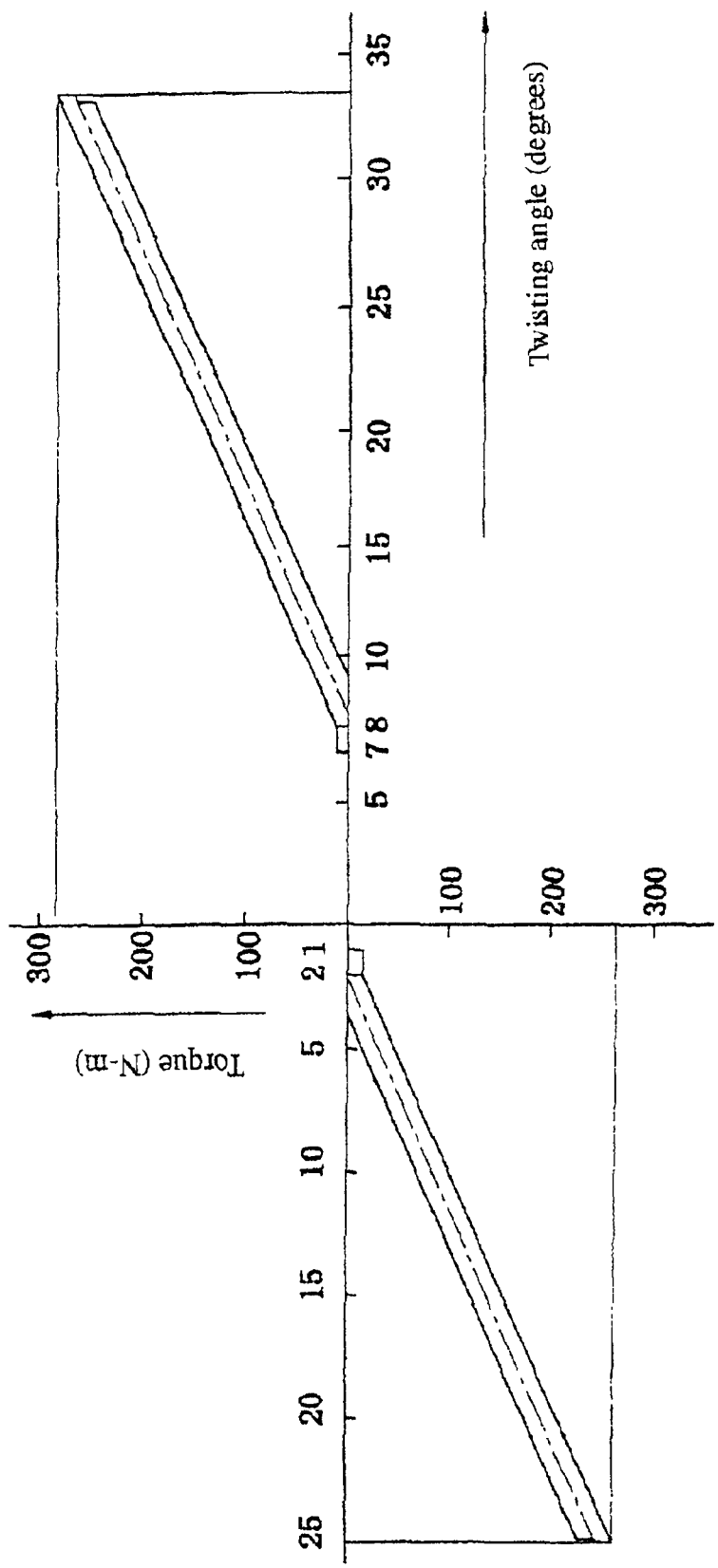
FIG. 18 is a view of a diagram illustrating a torsion characteristic curve for the damper mechanism.

In this embodiment, the stud pins 62 touch against the elastic members 104 in the manner shown in FIG. 15 such that the elastic members 104 are compressed in the rotational direction over the entire range of twisting angle θACp. Consequently, as shown in FIG. 18, the elastic members 104 exhibit rigidity over the entire range of twisting angle θACp. However, it is also acceptable to secure a space between the stud pins 62 and the elastic members 104 when in the condition shown in FIGS. 15 and 16 and compress the elastic members 104 over only a portion of twisting angle θACp. It is also acceptable to secure a large space between the stud pins 62 and the elastic members 104 when in the condition shown in FIGS. 15 and 16 and compress the elastic members 104 only at the end of the twisting angle θACp. In each of these cases, the impact that occurs between the stud pins 62 and the holes 69 within twisting angle θACp is softened.

The previously described embodiment was contrived such that the stud pins 62 touch against the first holes 101, but it is also acceptable to set the elastic members 104 such that they generate a larger load than the frictional resistance of the large friction mechanism 13 before being contacted by the stud pins. When this is done, there is no contact of the stud pins 62 against the edge of the holes 69 in the hub flange 6. Here, twisting angle θACp is the range over which the stud pins 62 can actually move in the R2 direction with respect to the hub flange 6 from the neutral position shown in FIG. 8.

Since the elastic members 104 are not fixed to the second hole 102, they can move in the axial direction. Consequently it is difficult for the elastic members 104 to slide against one of the friction plates 11 and 11' that exist on either side thereof. As a result, the elastic members 104 are not likely to wear or generate undesired hysteresis torque.

Next, the changes that occur in the torsion characteristic of the clutch disk assembly 1 in response to different types of torsional vibrations are described in detail. When large-amplitude torsional vibrations, such as longitudinal vibrations of the vehicle, occur, the damper mechanism fluctuates repeatedly between the second stages on the positive and negative sides of the torsion characteristic. In such a case, the longitudinal vibrations of the vehicle are immediately damped by the high hysteresis torque of the second stages.

We will now consider a case in which small torsional vibrations caused by engine combustion fluctuations are transferred to the clutch disk assembly 1 during normal travel. The spline hub 3 and the input rotary member 2 can rotate relative to each other within the range of the positive-side second stage gap angle θACp without actuating the large friction mechanism 13. In other words, within the gap angle θACp section of the torsion characteristic, the second springs 8 are compressed, but sliding does not occur in the large friction mechanism 13. As a result, small torsional vibrations (which can cause rattling and muffled noises during travel) are absorbed effectively.

Other Embodiments

A damper mechanism in accordance with alternate embodiments of the present invention will now be discussed. In view of the similarities between the alternate embodiments and aforementioned embodiment, discussed above, the components or parts of the alternate embodiments that have the same function of the corresponding components or parts of the aforementioned embodiment are being given the identical reference numerals. Moreover, the explanations of components or parts and the operations of the alternate embodiments that are similar to components or parts and the operations of the first embodiment will be omitted. Only components and operations of the alternate embodiments that are different in structure and function from the aforementioned embodiment will be explained herein.

Figure 20:
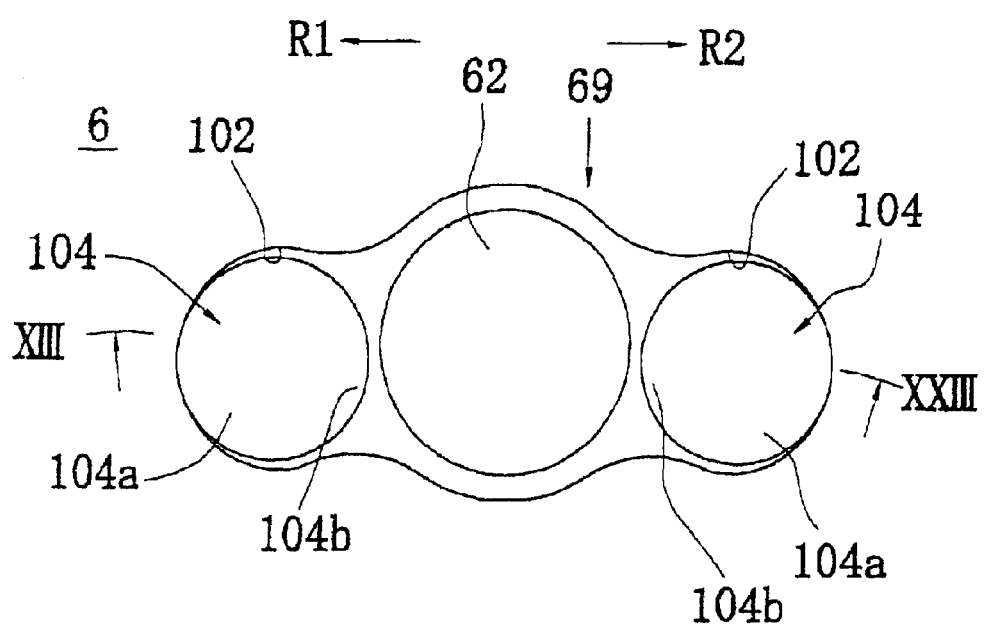
FIG. 20 is an elevational view illustrating the relationship between pins and holes in a hub flange of the clutch disk assembly in accordance with an alternate embodiment of the present invention.
Figure 21:
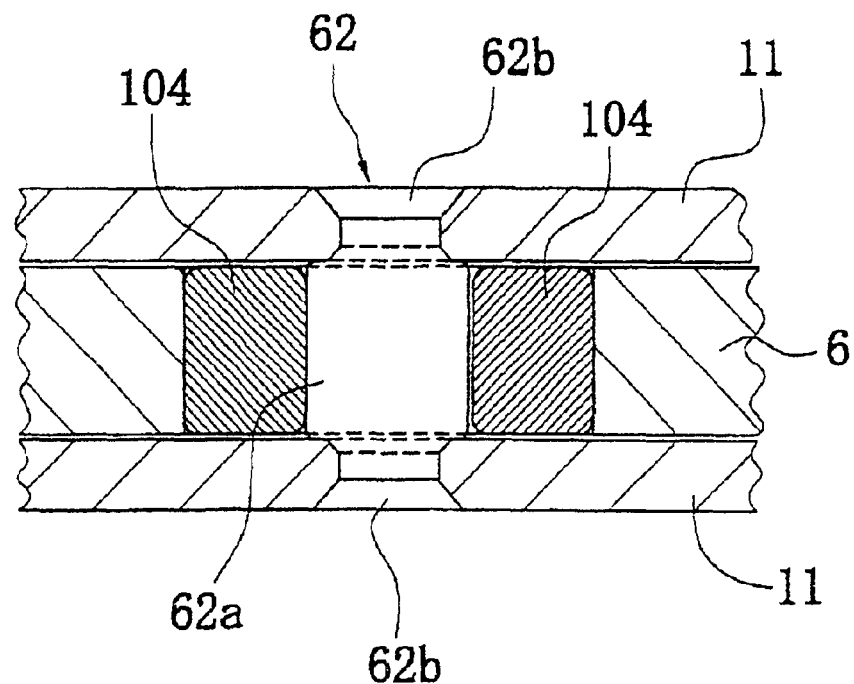
FIG. 21 is a cross sectional view taken along a line XXIII—XXIII of FIG. 20.

As shown in FIGS. 20 and 21, it is also acceptable to provide the elastic members 104 on both rotational direction sides of the stud pins 62. Here, each hole 69 has the first hole 101 and a pair of second holes 102. The second holes 102 are arranged on both rotational direction sides of the first hole 101 so as to form a single hole. One of the elastic members 104 is disposed in each of the second holes 102. The shape of the elastic members 104 and the relationship between the elastic members 104 and the second holes 102 is the same as in the previously described embodiment. With this embodiment, it is possible to soften the impact between the parts that strike each other in the friction suppressing mechanism in response to small torsional vibrations on the negative side of the torsion characteristic as well.

Figure 22:
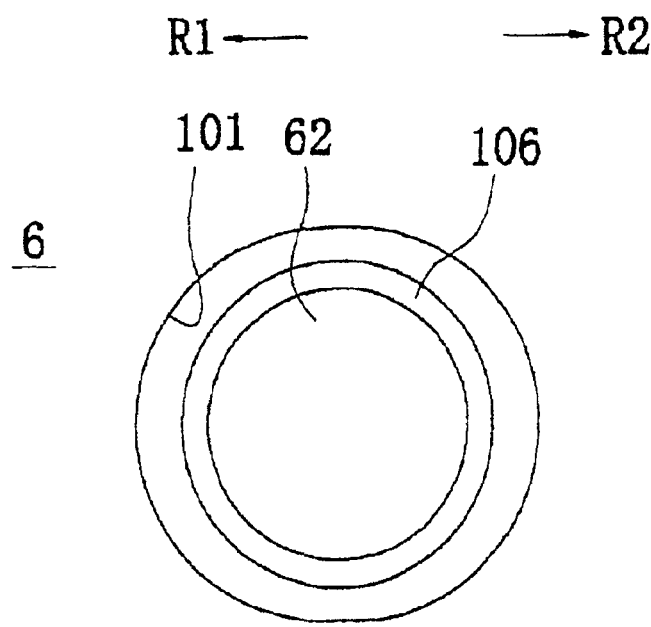
FIG. 22 is an elevational view illustrating the relationship between pins and holes in the hub flange of the clutch disk assembly in accordance with another alternate embodiment of the present invention.

It is also acceptable to wrap an elastic member 106 around the stud pins 62 as shown in FIG. 22. Here, holes 111 are shaped like a simple elongated circle or ellipse. This embodiment, too, provides the same effects as the previous embodiment. An acceptable variation is to provide the elastic members on only one side of the pins.

Figure 23:
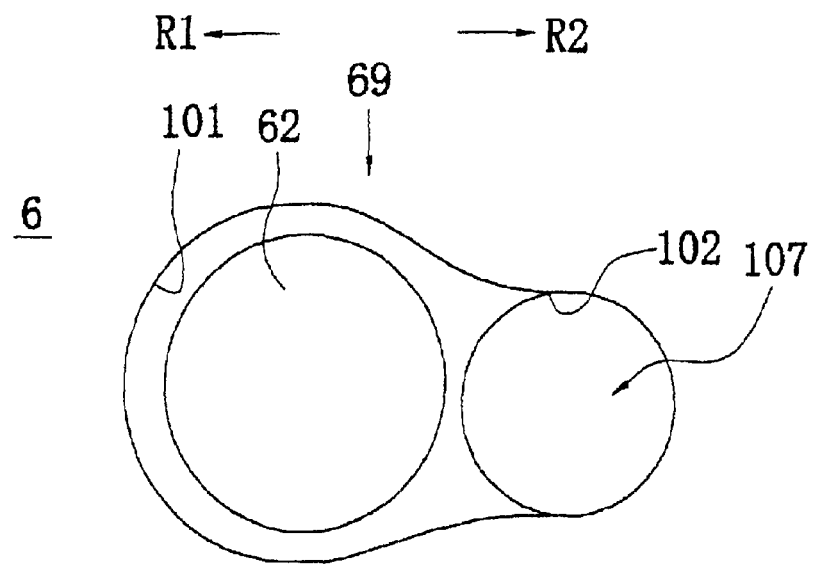
FIG. 23 is an elevational view illustrating the relationship between pins and holes in a hub flange of the clutch disk assembly in accordance with yet another alternate embodiment of the present invention.

It is also acceptable to mold elastic members 107 to each second hole 102 as shown in FIG. 23. When the elastic members are simply inserted into the second holes, assembly is difficult because the components are small. Furthermore, dimensional tolerances may cause variation in the gap settings between members. A potential result is that gaps are created between parts not intended to be separated by a gap and variations in the rigidity of the elastic members. These problems can be solved by molding the elastic members directly to the second holes.

Figure 24:
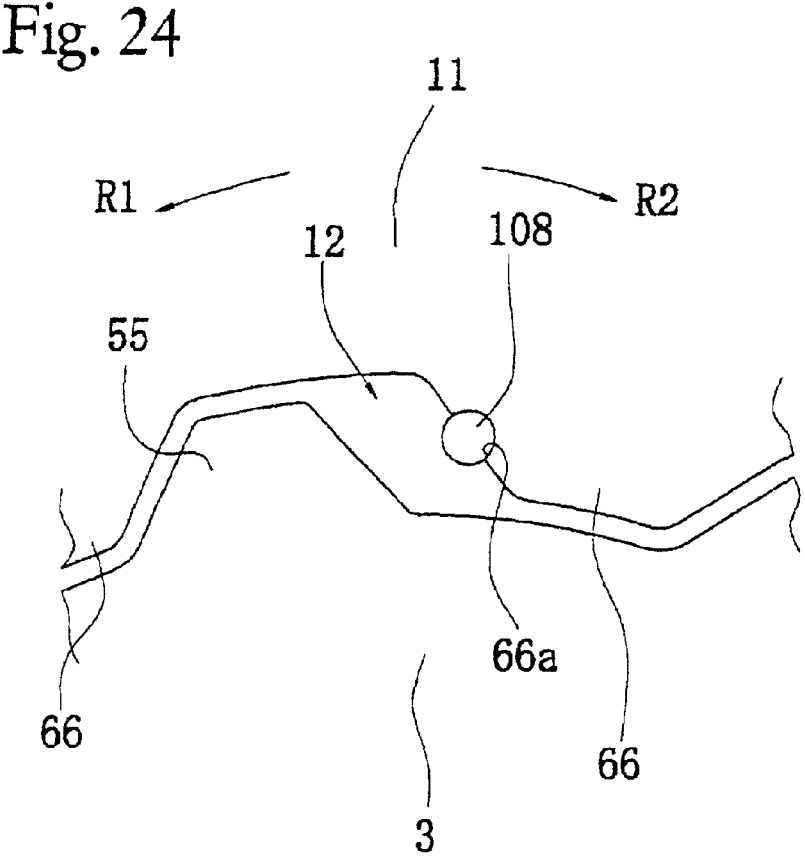
FIG. 24 is an elevational view illustrating the relationship between a spline hub and friction plates of the clutch disk assembly in yet another alternate embodiment of the present invention.

It is also acceptable to provide elastic members 108 between the external teeth 55 of the spline hub 3 and the internal teeth 66 of friction plates 11 as shown in FIG. 24. In FIG. 26, a friction member 108 is molded into a notch 66a in the face of the internal tooth 66 that faces in the R1 direction. Thus, this arrangement softens the impact when the external tooth 55 strikes the internal tooth 66 located on the R2 side thereof.

It is also acceptable to provide elastic members on the external tooth 55 or between the external tooth 55 and the internal tooth 66 on the R1 side thereof.

An embodiment having elastic members provided between the external teeth 55 of the spline hub 3 and the internal teeth 66 of friction plates 11 and 11' can be combined with an embodiment having elastic members provided between pins and holes in the hub flange or it can be used alone.

All of the embodiments described herein can be used alone or combined with other embodiments as required.

The shapes of the pins, first holes, second holes, and elastic members are not limited to the shapes used in the embodiments presented herein.

Damper mechanisms in accordance with the present invention are not limited to clutch disk assembly applications. For example, they can also be used as a damper mechanism to elastically couple two flywheels in the rotational direction.

Effects of the Invention

In a damper mechanism in accordance with the present invention, the members can strike against each other at the ends of the prescribed angular range due to engine combustion fluctuations because the frictional mechanism does not operate within the prescribed angular range. However, since the elastic members soften the impact between the members that contact each other, wearing of the members is reduced and enlargement of the prescribed angular range is suppressed.

The terms of degree such as "substantially," "about," and "approximately" as used herein mean a reasonable amount of deviation of the modified term such that the end result is not significantly changed. These terms should be construed as including a deviation of at least ±5% of the modified term if this deviation would not negate the meaning of the word it modifies.

This application claims priority to Japanese Patent Application No. 2001-67422. The entire disclosure of Japanese Patent Application No. 2001-67422 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A damper mechanism comprising:
   a first rotary member;
   a second rotary member being configured to rotate relative to said first rotary member;
   a damper section being configured to couple elastically said first rotary member and said second rotary member together in a rotational direction, said damper section including an intermediate rotary member being configured to rotate relatively to said first and second rotary members, said intermediate rotary member having a gourd-shaped hole including,
first hole,
a second hole being configured to overlap with said first hole, and
said first hole having a diameter larger than said second hole, and.
a protruding section being an intersection of said first and second holes;
a friction mechanism being configured to generate friction when said first rotary member and said second rotary member rotate relative to each other, said friction mechanism including a friction rotary member being configured to contact said second and intermediate rotary members in said rotational direction, said friction mechanism including a pin being configured to extend in said gourd-shaped hole;
a friction suppressing mechanism being configured to prevent said friction mechanism from operating within a prescribed angular range; and
an elastic member being configured to soften impact between said pin and said protruding section.

2. The damper mechanism according to claim 1, wherein said elastic member is arranged to be compressed in the rotational direction within said prescribed angular range.

3. The damper mechanism according to claim 2, wherein said elastic member is disposed rotationally between said friction rotary member and said intermediate rotary member.

4. The damper mechanism according to claim 3, wherein said intermediate rotary member includes a plate-like member having said gourd-shaped hole formed therein, and
said elastic member is arranged inside said second hole in rotational alignment with said pin, said elastic member is configured to be compressed between said pin and an edge of said second hole.

5. The damper mechanism according to claim 4, wherein said gourd-shaped hole comprises a third hole configured to overlap said first hole.

6. The damper mechanism according to claim 1, wherein said elastic member is disposed rotationally between said friction rotary member and said intermediate rotary member.

7. The damper mechanism according to claim 6, wherein said intermediate rotary member includes a plate-like member having said gourd-shaped hole formed therein, and
said elastic member is arranged inside said second hole in rotational alignment with said pin, said elastic member is configured to be compressed between said pin and an edge of said second hole.

8. The damper mechanism according to claim 1, wherein said prescribed angular range comprises a rotational gap, said friction suppressing mechanism defining said gap between said second rotary member and said friction rotary member, and between said friction rotary member and said intermediate rotary member in said rotational direction.

9. The damper mechanism according to claim 1, wherein said first and second holes are circular.

10. The damper mechanism according to claim 1, wherein said elastic member is arranged in said second hole.

11. A clutch disk assembly being configured to transfer torque from an engine and dampen vibrations from a flywheel, the clutch disk assembly comprising:
an input rotary member;
an output rotary member being disposed to rotate relative to said input rotary member;
a damper mechanism having
a spring member being configured to couple rotationally said input rotary member and said output rotary member, and
a torsion characteristic having
a positive side corresponding to said input rotary member being twisted in a rotational drive direction with respect to said output rotary member,
a negative side corresponding to said input rotary member being twisted in a direction opposite said rotational drive direction with respect to said output rotary member,
a first stage,
a second stage corresponding to said spring member being compressed, said second stage having a higher rigidity than said first stage, said second stage existing on both said positive side and said negative side, and
an intermediate rotary member being configured to rotate relatively to said input and output rotary members, said intermediate rotary member having a gourd-shaped hole including,
a first hole,
a second hole being configured to overlap with said first hole, and
said first hole having a diameter larger than said second hole, and
a protruding section being an intersection of said first and second holes;
a friction mechanism being configured to generate friction when said input rotary member and said output rotary member rotate relative to each other within said second stage and said spring member exerts an elastic force, said friction mechanism including a friction rotary member being configured to contact said output and intermediate rotary members in said rotational direction, said friction mechanism including a pin being configured to extend in said gourd-shaped hole;
a friction suppressing mechanism being configured to secure a rotational gap in said second stage, said friction suppressing mechanism being configured to prevent said elastic force of said spring member from acting on said friction mechanism within a prescribed angular range; and
an elastic member being configured to soften impact between said pin and said protruding section.

12. The clutch disk assembly according to claim 11, wherein said elastic member is arranged to be compressed in the rotational direction within prescribed angular range.

13. The clutch disk assembly according to claim 12, wherein
said elastic member is disposed rotationally between said friction rotary member and said intermediate rotary member.

14. The clutch disk assembly according to claim 13, wherein
said intermediate rotary member includes a plate-like member having said gourd-shaped hole formed therein, said plate-like member is arranged axially adjacent said input rotary member, and
said elastic member is arranged inside said second hole in rotational alignment with said pin, said elastic member is configured to be compressed between said pin and an edge of said hole.

15. The clutch disk assembly according to claim 14, wherein said hole comprises a third hole configured to overlap said first hole.

16. The clutch disk assembly according to claim 11, wherein
said elastic member is disposed rotationally between said friction rotary member and said intermediate rotary member.

17. The clutch disk assembly according to claim 16, wherein
said intermediate rotary member includes a plate-like member having said gourd-shaped hole formed therein, said plate-like member is arranged axially adjacent said input rotary member, and
said elastic member is arranged inside said second hole in rotational alignment with said pin said elastic member is configured to be compressed between said pin and an edge of said second hole.

18. The clutch disk assembly according to claim 11, wherein said first and second holes are circular.

19. The clutch disk assembly according to claim 11, wherein said elastic member is arranged in said second hole.

20. The clutch disk assembly according to claim 11, further comprising a second elastic member arranged to interpose a portion of said pin with said elastic member.

21. The clutch disk assembly according to claim 20, wherein said gourd-shaped hole further includes a second protruding section that is an intersection between said first and third holes, said pin being configured to impact said second protruding section.

* * * * *